US012673874B2

(12) United States Patent
Lee et al.

(10) Patent No.: US 12,673,874 B2
(45) Date of Patent: Jul. 7, 2026

(54) METHOD FOR MANUFACTURING POROUS SILICON AND SECONDARY BATTERY ANODE ACTIVE MATERIAL CONTAINING SAME

(71) Applicant: DONG-A UNIVERSITY RESEARCH FOUNDATION FOR INDUSTRY-ACADEMY COOPERATION, Busan (KR)

(72) Inventors: Jung Kyoo Lee, Busan (KR); Na Eun Yoon, Busan (KR); Dong Hwan Kang, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 825 days.

(21) Appl. No.: 17/913,059

(22) PCT Filed: Mar. 16, 2021

(86) PCT No.: PCT/KR2021/003246
§ 371 (c)(1),
(2) Date: Sep. 20, 2022

(87) PCT Pub. No.: WO2021/194149
PCT Pub. Date: Sep. 30, 2021

(65) Prior Publication Data
US 2023/0142512 A1 May 11, 2023

(30) Foreign Application Priority Data
Mar. 26, 2020 (KR) ........................ 10-2020-0036981

(51) Int. Cl.
*C01B 33/021* (2006.01)
*C01B 33/037* (2006.01)
*H01M 10/052* (2010.01)

(52) U.S. Cl.
CPC .......... *C01B 33/021* (2013.01); *C01B 33/037* (2013.01); *H01M 10/052* (2013.01);
(Continued)

(58) Field of Classification Search
CPC ... C01B 33/021; C01B 33/023; C01B 33/037; C01P 2004/64; C01P 2006/12;
(Continued)

(56) References Cited

U.S. PATENT DOCUMENTS

2009/0010833 A1* 1/2009 Rosenband ........... C01B 33/021
                                                              423/349
2009/0092899 A1* 4/2009 Treger .................. C01B 33/023
                                                              429/188
(Continued)

FOREIGN PATENT DOCUMENTS

CN      106191467 A  * 12/2016  ........... C01B 33/023
KR    20100045762 A  *  5/2010  ........... C01B 33/021
(Continued)

OTHER PUBLICATIONS

English Translation of WO2019039856A1 (Year: 2019).*
(Continued)

*Primary Examiner* — Sally A Merkling
*Assistant Examiner* — Jordan W Taylor
(74) *Attorney, Agent, or Firm* — STIP Law Group, LLC

(57) ABSTRACT

A porous silicon manufacturing method according to the present invention comprises the steps of: pretreating a silicon precursor and a heat dispersant; and conducting a thermal reduction reaction between the heat dispersant-pretreated silicon precursor and a metal reducing agent by using a rotary reaction chamber. When porous silicon manufactured by the manufacturing method is contained in a secondary battery anode active material and used in secondary batteries, the batteries exhibit high capacity and long lifespan characteristics. The present invention relates to a method for manufacturing porous silicon and a method for manufacturing a secondary battery anode active material containing the porous silicon manufactured thereby, with the
(Continued)

(i) step of conducting primary heat treatment on first mixture containing silicon precursor and heat dispersant (ii) step of feeding metal reducing agent to first mixture and stirring same to form second mixture (iii) step of subjecting second mixture to secondary heat treatment in rotary reaction (iv) step of washing secondarily heat-treated second mixture with solvent to recover porous silicon aim of solving the problems with silicon materials under development for anode active materials for lithium secondary batteries, including excessive volume expansion during charge/discharge and resultant electrode fracture and lifespan shortening.

10 Claims, 15 Drawing Sheets

(52) U.S. Cl.
CPC ...... *C01P 2004/64* (2013.01); *C01P 2006/12* (2013.01); *C01P 2006/14* (2013.01); *C01P 2006/40* (2013.01)

(58) Field of Classification Search
CPC ........... C01P 2006/14; C01P 2006/40; H01M 10/052; H01M 10/0525; H01M 4/0471; H01M 4/139; H01M 4/366; H01M 4/386; H01M 4/587; H01M 4/625; Y02E 60/10
See application file for complete search history.

(56) References Cited

U.S. PATENT DOCUMENTS

2017/0137295 A1* 5/2017 Cho ...................... C01B 33/023
2019/0031516 A1* 1/2019 Gigler ...................... C01F 5/04

FOREIGN PATENT DOCUMENTS

| KR | 20150000069 | A | 1/2015 | |
|----|----|----|----|----|
| KR | 20160037334 | A | 4/2016 | |
| KR | 101636923 | B1 | 7/2016 | |
| KR | 20190022365 | A * | 3/2019 | ........... H01M 4/587 |
| WO | WO-2011042742 | A1 * | 4/2011 | ............... B22F 1/18 |
| WO | WO-2014209682 | A1 * | 12/2014 | ............. B01J 21/08 |
| WO | WO-2016201611 | A1 * | 12/2016 | ........... H01M 4/625 |
| WO | WO-2019039856 | A1 * | 2/2019 | ........... C01B 33/021 |

OTHER PUBLICATIONS

Lee et al. (KR20190022365A English (Year: 2019).*
Won (KR20100045762A English) (Year: 2010).*
Cui et al. CN106191467A English (Year: 2016).*
International search report of PCT/KR2021/003246, Jun. 25, 2021, English translation.
Zhihao Bao et al, Chemical reduction of three-dimensional silica micro-assemblies into microporous silicon replicas, LETTERS, Mar. 8, 2007, vol. 446, pp. 172-175, Nature publishing Group, Berlin, Germany.
Wei Luo et al, Efficient Fabrication of Nanoporous Si and Si/Ge Enabled by a Heat Scavenger in Magnesiothermic Reactions, Scientific Reports, Jul. 17, 2013, vol. 3, Issue 2222, pp. 1-7, Nature Research, London, United Kingdom.
The extended European Search Report of EP 21 77 4152, May 15, 2024.

* cited by examiner

FIG 2.

(i) step of conducting primary heat treatment on first mixture containing silicon precursor and heat dispersant

(ii) step of feeding metal reducing agent to first mixture and stirring same to form second mixture

(iii) step of subjecting second mixture to secondary heat treatment in rotary reaction

(iv) step of washing secondarily heat-treated second mixture with solvent to recover porous silicon FIG. 3
(a)
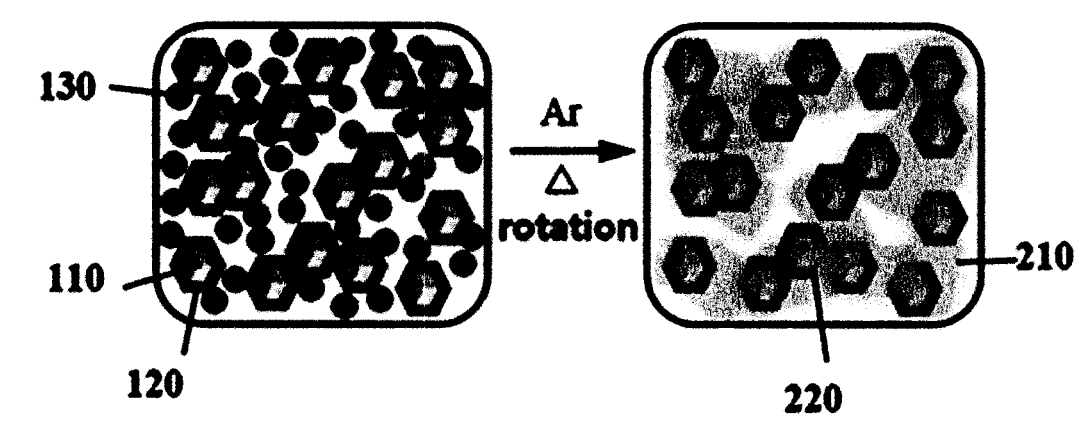
(b)
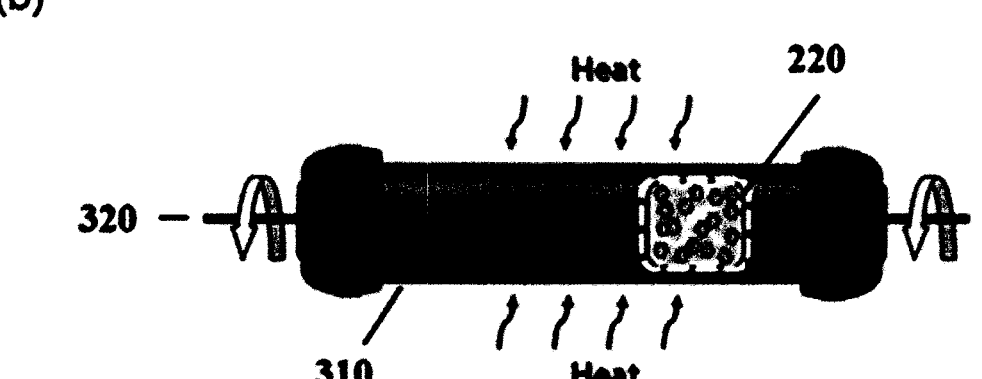

FIG. 6
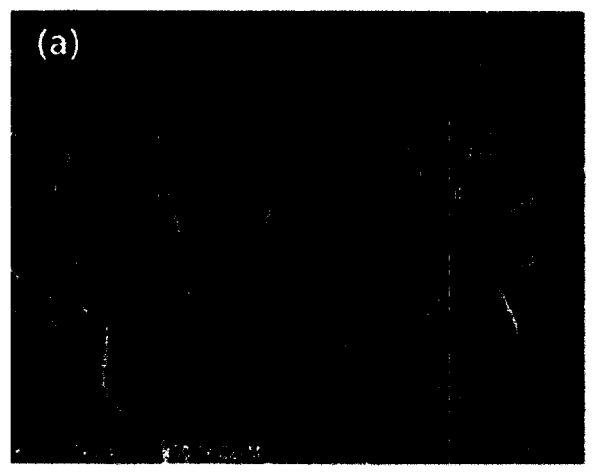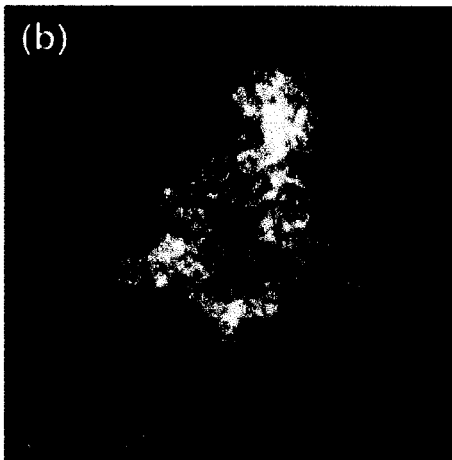

METHOD FOR MANUFACTURING POROUS SILICON AND SECONDARY BATTERY ANODE ACTIVE MATERIAL CONTAINING SAME

CROSS-REFERENCE TO RELATED APPLICATIONS

This application is the U.S. National Phase under 35 U.S.C. § 371 of International Application No. PCT/KR2021/003246 filed on Mar. 16, 2021, which in turn claims the benefit of Korean Application No. 10-2020-0036981 filed on Mar. 26, 2020, the disclosures of which are incorporated by reference into the present application.

TECHNICAL FIELD

The present disclosure relates to porous silicon, a secondary battery anode active material containing same, a manufacturing method therefor, and an electrode and a secondary battery, each containing the secondary battery anode active material for a secondary battery.

BACKGROUND ART

To improve the efficiency of electric vehicles and large-capacity energy storage systems, extensive research is being actively conducted on lithium secondary batteries. With the increase in the need for secondary batteries as storage devices with high energy density (Wh/kg or Wh/l), high power density (W/kg or W/l), and high stability, research and development have been focused on cathode and anode materials, separators, and electrolytes, which are all key elements of secondary batteries.

Since the commercialization of lithium secondary batteries, graphite has been used as an anode material. This material enjoys the advantages of low price, low driving voltage, and excellent lifetime stability. However, graphite has a low theoretical capacity of about 372 mAh/g and suffers from the disadvantage of being poor in rate capability due to its low storage (charging) rate of lithium ions, thereby being limited in application as an anode material for high-performance secondary batteries. With the development of high-capacity cathode materials, the graphite anode material needs to be coated more thickly, but when a high current density is applied to the graphite anode material, lithium metal is precipitated due to a slow storage rate of lithium ions to form dendrites, thereby increasing the risk of explosion.

As the need for developing a high-capacity anode material capable of replacing low-capacity and low-power graphite is emerging, metals in IV and V groups, such as Si, Sn, Ge, Pb, As, Bi, etc., which serve as an alternative anode material to form an electrochemical alloy with lithium, are extensively being studied.

Among them, silicon, which is a highly abundant resource on earth, is one of the most promising anode materials due to its relatively low driving voltage (~0.4 V) and high theoretical capacity (~3,579 mAh/g). However, silicon is low in electric conductivity. Moreover, as silicon reacts with up to about four lithium ions per silicon atom during repeated charge/discharge cycles, it expands in volume by about 280%, causing electrode fracture. In addition, the reaction between the newly created silicon surface and the electrolyte in this process continuously creates a solid electrolyte interface (SEI) and provokes high initial irreversible capacity, high resistance formation, and drastic capacity reduction, giving rise to a decrease in the lifespan of the secondary batteries.

To solve the problems caused by the volume expansion of silicon, many attempts have been made to form porous silicon particles so that the volume expansion is absorbed inside the silicon particles. Various porous silicon manufacturing methods, such as chemical or electrochemical etching methods for silicon wafers, etching methods induced by metals doped to commercially available silicon particles, etc. have been reported, but they have limitations in their use as economical mass production methods due to the use of expensive raw materials, low silicon yield, high-cost process, and excessive use of harmful chemicals such as hydrofluoric acid.

Non-patent literature 1 discloses a method for manufacturing porous silicon through magnesiothermic reduction of various forms of silica (Z. Bao et al., Nature, 2007, 446, 172). The reduction of silica using magnesium as a reductant can be expressed as Equation 1, below. This reaction is conducted at as low as 650° C. with the concomitant generation of very great heat. The high heat generated induces intra- and interparticle sintering, which increases the size of primary silicon particles and causes a problem in maintaining the porous structure. As an alternative, non-patent literature 2 discloses a method in which inorganic mineral additives with large heat capacity, such as sodium chloride (NaCl, $\Delta H_{fus}=28.8$ kJ/mol), etc., are used as a heat dispersant (W. Luo, et al., Sci. Rep., 2013, 3, 2222). If the reduction temperature remains high or the high heat generation is not controlled despite the addition of a heat dispersant, $Mg_2SiO_4$ with a very stable structure is generated according to Equation 2. Under the condition that the molar ratio of Mg to $SiO_2$ deviates from the stoichiometric ratio of 2:1, $Mg_2Si$ is by-produced according to Equations 3 and 4, resulting in a decrease in the yield and purity of the silicon finally obtained.

$$SiO_2 \text{ (s)}+2Mg \text{ (g or l)}\rightarrow Si \text{ (s)}+2MgO \text{ (s)}, \Delta H=-586.7 \text{ kJ/mol}_{SiO2} \qquad \text{(Equation 1)}$$

$$2MgO \text{ (s)}+SiO_2\rightarrow Mg_2SiO_4 \text{ (s)} \qquad \text{(Equation 2)}$$

$$2Mg+Si\rightarrow Mg_2Si \qquad \text{(Equation 3)}$$

$$4Mg+SiO_2\rightarrow Mg_2Si+2MgO \qquad \text{(Equation 4)}$$

As illustrated in Equation 5, magnesium oxide (MgO) produced according to Equation 1 can be removed by pickling with a hydrochloric acid (HCl) solution. In addition, as described in Equation 6, the by-product $Mg_2Si$ in Equations 3 and 4 is easily removed in the form of $MgCl_2$ when washed with a hydrochloric acid solution, but $SiO_2$ is regenerated in this process, thereby reducing the conversion rate of the silicon precursor and the yield of porous silicon.

High purity and high yield of porous silicon are achieved by removing $SiO_2$ through etching with an aqueous hydrofluoric acid (HF) solution as shown in Equation 7. To avoid the poisonous hydrofluoric acid etching process or to minimize the amount of hydrofluoric acid used, it is preferable to increase the conversion rate of the silicon precursor in the magnesium reduction reaction of Equation 1 and suppress the $Mg_2Si$ side reaction of Equations 3 and 4 above.

In addition, since $Mg_2SiO_4$ generated in Equation 2 is stable, even when hydrofluoric acid etching is performed, stable $MgF_2$ is formed according to Equation 8 below to lower the purity of the finally obtained silicon. Thus, it is preferable to also suppress the production of $Mg_2SiO_4$.

$$MgO+2HCl \rightarrow MgCl_2+H_2O \qquad \text{(Equation 5)}$$

$$Mg_2Si+4HCl+2H_2O \rightarrow 2MgCl_2+SiO_2+4H_2 \qquad \text{(Equation 6)}$$

$$SiO_2+6HF \rightarrow H_2[SiF_6]+2H_2O \qquad \text{(Equation 7)}$$

$$Mg_2SiO_4+10HF \rightarrow 2MgF_2+H_2[SiF_6]+4H_2O \qquad \text{(Equation 8)}$$

However, in the conventional magnesium thermal reduction method shown in FIG. 1, an open reaction system under an inert gas flow (FIG. 1(a)) or a closed reaction system under an inert gas atmosphere (FIG. 1(b)) is applied, and the reaction proceeds while the reaction chamber is kept in a fixed state.

With reference to FIGS. 1(a) and 1(b), in the case of an open reaction system under an inert gas flow, magnesium which is used as a metal reducing agent undergoes evaporative loss or it is difficult to uniformly mix magnesium and silicon precursors. In addition, since the molar ratio of Mg and $SiO_2$ cannot form a stoichiometric ratio of 2:1 at all points inside the reaction chamber, side reactions of Equations 2 to 4 are unavoidable so that the yield of porous silicon is mostly lowered to 50% or less. Furthermore, the system requires a complex purification process such as etching with harmful hydrofluoric acid (HF) for attaining highly pure silicon.

If not controlled, the high reaction heat generated in the magnesiothermic reduction provokes the side reactions of Equations 2 to 4 and sinters silicon particles, increasing the size of the silicon primary particles for porous silicon and limiting the development of pores.

Related art patent literatures 1 and 2 disclose a method for producing porous silicon and a secondary battery using same. More specifically, conditions of temperatures and time for the step of thermally treating a silicon precursor and alkaline earth metal/magnesium powder mixtures are disclosed. However, the mixtures are thermally treated in a stagnant state. This thermal treatment is unable to control the reaction heat as in the closed reaction system under an inert gas atmosphere, shown in FIG. 1(b), and thus suffers from the problem of side reactions and sintering phenomena between silicon particles.

To solve the problems raised upon the production of porous silicon particles through magnesiothermic reaction, a rotatable reaction chamber, and an optimal mixing order of ingredients fed thereto are applied to the magnesiothermic reaction, leading to the development of a method for manufacturing porous silicon, which can suppress the side reactions of Equations 2 to 4, achieve a high conversion rate of silicon precursors, and remarkably increase the yield of porous silicon through a simple purification process.

RELATED ART DOCUMENTS

Patent Document (Patent literature 1) Korean Patent Number 10-0493960 (issued Jun. 10, 2005)
(Patent literature 2) Korean Patent Number 10-1573423 (issued Dec. 2, 2015)

Non-Patent Document (Non-Patent literature 1) Z. Bao et al., Nature, 2007, 446, 172-175
(Non-Patent literature 2) W. Luo et al., Sci. Rep., 2013, 3, 2222

DISCLOSURE

Technical Problem

An aspect of the present disclosure is to provide a method for manufacturing porous silicon with high purity and high yield and a method for producing a secondary battery anode active material containing the porous silicon, whereby the problems with silicon as a secondary battery anode material, including volume expansion and resultant short lifespan characteristics, can be solved.

Another aspect of the present disclosure is to provide a secondary battery anode active material with high capacity and long lifespan characteristics, produced by the production method, which exhibits excellent charge/discharge cycle efficiency and effectively absorbs volumetric changes with charging and discharging.

A further aspect of the present disclosure is to provide a secondary battery anode containing the secondary battery anode active material and an electrode, a secondary battery, a power storage device, and an electronic device, each including the anode.

Technical Solution

In accordance with an aspect thereof, the present disclosure provides a method for manufacturing porous silicon, the method including the steps of: (1) conducting primary heat treatment on a first mixture containing a silicon precursor and a heat dispersant; (2) feeding a metal reducing agent to the first mixture and stirring same to form a second mixture; (3) subjecting the second mixture to a secondary heat treatment in a rotary reaction chamber; and (4) washing the secondarily heat-treated second mixture with a solvent to recover porous silicon particles.

In an embodiment of the present disclosure, the silicon precursor may be in various forms with various particle sizes and may be any one of silicon dioxide ($SiO_2$), silicon oxide (SiOx, 0<x<2), silica gel, sand, glass, quartz, zeolite, and fumed silica.

In another embodiment of the present disclosure, the heat dispersant may be any one of sodium chloride (NaCl), potassium chloride (KCl), calcium chloride ($CaCl_2$), and magnesium chloride ($MgCl_2$).

The heat dispersant may be contained at an amount of 100 to 1,200 parts by weight, based on 100 parts by weight of the silicon precursor.

The primary heat treatment is conducted at a temperature of 550 to 800° C. for 1 to 5 hours.

In an embodiment of the present disclosure, the metal dispersant may be selected from sodium (Na), magnesium (Mg), aluminum (Al), and a combination thereof.

The metal reducing agent may be used at an amount of 50 to 200 parts by weight, based on 100 parts by weight of the silicon precursor.

The secondary heat treatment is carried out at a temperature of 300 to 1,000° C. for 1 to 24 hours under a pressure of $10^{-3}$ to 5 bar in a non-oxidative atmosphere.

The secondary heat treatment is carried out while the rotary reaction chamber revolves 1 to 1,000 times per minute.

Step (4) is carried out by the sub-steps of: (4-1) washing the secondarily heat-treated reaction product with distilled water to remove the heat dispersant; (4-2) washing the heat dispersant-removed reaction product with a first acid solution to remove the oxidized metal reducing agent and recover the porous silicon; and (4-3) etching the recovered porous silicon with a second acid solution to remove impurities therefrom.

In an embodiment of the present disclosure, the porous silicon particles recovered in step (4) have a specific surface area of 20 to 200 $m^2/g$ and a total pore volume of 0.1 $cm^3/g$ to 1.0 $cm^3/g$ as measured by a BET method; and individual primary silicon particles as constituents in the porous silicon particles have an average size of 10 to 50 nm.

A method for producing a secondary battery anode active material according to the present disclosure may employ the porous silicon manufactured using the method for manufacturing porous silicon.

The method for producing a secondary battery anode active material further includes a carbon coating step (5).

In an embodiment of the present disclosure, the carbon coating step (5) may be carried out just after step (4-1) or (4-3) wherein when the carbon coating step (5) is carried out just after step (4-1), a tertiary heat treatment is conducted before steps (4-2) to (4-3).

The carbon coating step (5) includes conducting a tertiary heat treatment on a third mixture of the recovery reaction product and a carbon precursor.

The secondary battery anode active material containing the porous silicon according to the present disclosure may be produced by the method for producing a secondary battery anode active material.

In addition, the electrode for a secondary battery according to the present disclosure may include the secondary battery anode active material.

Furthermore, the secondary battery of the present disclosure may include the electrode for a secondary battery.

Moreover, the power supply system may employ the secondary battery.

Advantageous Effects

In the method for manufacturing porous silicon according to the present disclosure, a mixture of the silicon precursor coated uniformly with a heat dispersant and the metal reducing agent is thermally treated in a rotation state to decrease the reaction heat accumulated in the porous silicon, whereby the silicon particles can be restrained from being sintered and the melted metal reducing agent can diffuse over the silicon precursor at an increased rate while a uniform admixture therebetween is allowed.

Also, approximation of the reaction molar ratio of Mg and $SiO_2$ in Equation 1 to the stoichiometric ratio of $Mg:SiO_2=2:1$ increases the conversion rate of the silicon precursor, decreases the size of the primary silicon particles, and represses the production of by-products such as $Mg_2Si$ and $Mg_2SiO_4$, thereby allowing for mass production of porous silicon particles with high yield and high purity.

As a porous silicon-carbon composite, the secondary battery anode active material provided by the present disclosure has a cavity inside the silicon particles and/or the carbon layer and thus can buffer the volumetric change generated during charging/discharging when used as an anode material, exhibiting high capacity and long lifespan characteristics.

In addition, the use of the secondary battery anode active material provided by the present disclosure can guarantee high capacity and long lifespan characteristics for an electrode for a secondary battery, a secondary battery, a power storage device, and an electronic device.

DESCRIPTION OF DRAWINGS

FIG. 2 is a block diagram illustrating a method for manufacturing porous silicon according to the present disclosure.

FIG. 3 schematically shows compositions of reactants used in a method for manufacturing porous silicon according to the present disclosure and distribution of the reactants in a rotary reaction chamber (a) and a rotary reaction chamber used in magnesiothermic reduction (b).

FIG. 6 shows an SEM image of the silicon precursor zeolite Y used as a silicon precursor in Examples 1 to 7 and Comparative Examples 1 to 3 (a) and a TEM image of the porous silicon particles 4 in Example 4 (b).

FIG. 9(*g*) is an enlarged view of the section $2\theta=15~30°$ in the XRD profiles for Example 2 and Comparative Example 1.

BEST MODE INVENTION

Figure 1:
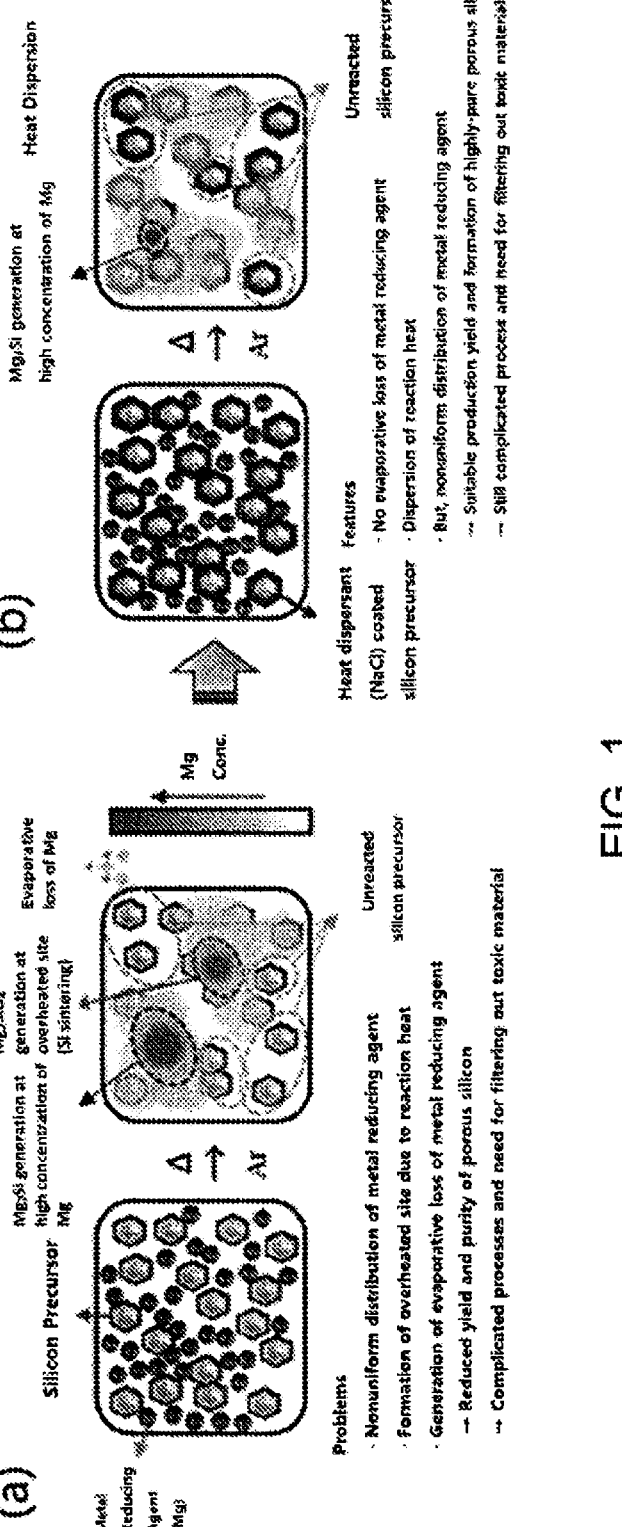
FIG. 1 shows conventional magensiothermic reduction methods in an open reaction system under a flow of inert gas (a) and in a closed reaction system under an inert gas atmosphere (b).

Below, a detailed description will be given of the present disclosure. In each drawing of the present disclosure, sizes or scales of components may be enlarged or reduced from their actual sizes or scales for better illustration, and known components may not be depicted therein to clearly show features of the present disclosure. Therefore, the present disclosure is not limited to the drawings. When describing the principle of the embodiments of the present disclosure in detail, details of well-known functions and features may be omitted to avoid unnecessarily obscuring the presented embodiments.

Unless otherwise defined, all technical and scientific terms used herein have the same meanings as those typically understood by those skilled in the art to which the present disclosure belongs. In general, the nomenclature used herein is well known in the art and is typical.

Throughout the specification, when a portion may "include" a certain constituent element, unless explicitly described to the contrary, it may not be construed to exclude another constituent element but may be construed to further include other constituent elements.

In addition, throughout this specification, the expression of performing a step "after" or "subsequent to" a specific step means that it is performed with any subordinate order in time series, which should not be construed to be conducted successively or just after the step unless otherwise specified, such as "immediately after", etc. For instance, performing step (b) "after" or "subsequent to" step (a) means that step (b) is performed immediately following performing step (a), or step (b) may be performed after any step (c) is performed subsequent to step (a).

Below, a detailed description will be given of a method for manufacturing porous silicon according to the present disclosure with reference to the drawings.

FIG. 2 is a block diagram explaining a method for manufacturing porous silicon according to Examples 1 to 5 and Comparative Example 3. Referring to FIG. 2, the method for manufacturing porous silicon of the present disclosure includes the steps of: (1) conducting primary heat treatment on a first mixture containing a silicon precursor and a heat dispersant; (2) feeding a metal reducing agent to the first mixture and stirring same to form a second mixture; (3) subjecting the second mixture to a secondary heat treatment in a rotary reaction chamber; and (4) washing the secondarily heat-treated second mixture with a solvent to recover porous silicon particles.

Step (1) is set forth to primarily treat a first mixture containing a silicon precursor and a heat dispersant with heat to remove moisture and hydroxyl groups inside the pores of the silicon precursor and coat the silicon precursor with the heat dispersant.

In step (1), the silicon precursor, which is a raw material used in the method for manufacturing porous silicon of the present disclosure, may be in various forms with various particle sizes and may be at least one of the well-known materials containing Si, such as silicon dioxide ($SiO_2$), silicon oxide ($SiOx$, $0<x<2$), silica gel, sand, glass, quartz, zeolite, fumed silica, and so on.

Being applied to the silicon precursor, the heat dispersant functions to restrain the aggregation and sintering of the primary silicon particles from the high reaction heat generated during the heat treatment of the silicon precursor and the metal reducing agent and suppress side reactions caused by the high heat.

The heat dispersant may be at least one of sodium chloride (NaCl), potassium chloride (KCl), calcium chloride ($CaCl_2$), and magnesium chloride ($MgCl_2$) and may be contained at an amount of 100 to 1,200 parts by weight and preferably at an amount of 300 to 1,000 parts by weight, based on 100 parts by weight of the silicon precursor. Less than 100 parts by weight of the heat dispersant result in a non-uniform coating over the entire silicon precursor particles whereas more than 1,200 parts by weight do not bring about an increase in the coating effect.

The mixing of the silicon precursor and heat dispersant contained in the first mixture may be carried out in a dry or wet mixing manner, but is not limited thereto. Any well-known mixing method may be taken.

The primary heat treatment step is performed to remove moisture and hydroxyl groups (—OH) inside the pores of the silicon precursor as well as coating the silicon precursor with the heat dispersant. Specifically, the step may be carried out in a moisture-free gas atmosphere at a temperature of 550° C. to 800° C. for 3 to 7 hours and particularly at a temperature of 650 to 750° C. for 4 to 6 hours. When the temperature of the primary heat treatment is less than 550° C., the removal of moisture and hydroxyl group (—OH) inside the pores is insignificant. A temperature exceeding 800° C. does not further increase the effect of removing moisture and hydroxyl group (—OH) inside the pores.

In step (2), a metal reducing agent is added to and mixed with the heat dispersant-coated silicon precursor to form a second mixture.

The metal reducing agent may be one or a mixture of metal elements in groups 1A, 2A, and 3A of the periodic table. In a particular embodiment, the metal reducing agent may be selected from sodium (Na), magnesium (Mg), calcium (Ca), aluminum (Al), and a combination thereof.

When the metal reducing agent is a mixture of the metal elements, the mixing ratio is determined depending on the types of the metal reducing agent and the silicon precursor in consideration of the reaction molar ratios of Equations 1 to 4. As an example of determining the mixing ratio, when the metal reducing agent and the silicon precursor are magnesium and silicon dioxide, respectively, magnesium may be mixed at an amount of 50 to 200 parts by weight and particularly at an amount of 70 to 90 parts by weight per 100 parts by weight of silicon dioxide in consideration with Equation 1. When the content of the metal reducing agent is less than 50 parts by weight or more than 200 parts by weight, the reaction molar ratio does not meet the stoichiometric ratio $Mg:SiO_2=2:1$ so that reactions of producing by-products proceed, thus decreasing the conversion rate of the silicon precursor and the yield of the porous silicon.

Prior to step (3) of subjecting the second mixture to a secondary heat treatment for reducing the silicon precursor into a reaction product, the method may further include a step of drying the second mixture of the first mixture and the metal reducing agent in a vacuum. This vacuum drying step is to remove moisture contained in the second mixture and may be carried out at a temperature of 80 to 300° C. for 2 to 20 hours and particularly at a temperature of 200 to 300° C. for 3 to 7 hours.

In step (3), the silicon precursor is reduced into porous silicon through the secondary heat treatment with the concomitant oxidation of the metal reducing agent into a metal oxide.

FIG. 3 illustrates step (3) in which the second mixture is fed into a rotary reaction chamber, followed by reducing the silicon precursor through secondary heat treatment while rotating the chamber. Referring to FIG. 3, the chamber is rotated to allow the silicon precursor, the heat dispersant, and the metal reducing agent to be mixed uniformly with each other, whereby the reaction molar ratio of the metal reducing agent and the silicon precursor approximates the stoichiometric ratio of $Mg:SiO_2=2:1$ throughout the reaction chamber and the side reactions are restraint, and an improvement in the conversion rate of the silicon precursor and the yield of the porous silicon is made, compared to the reaction in a stagnant state. In this regard, the rotary reaction chamber may be a closed or open type, with a preference for a closed type in terms of the efficiency of the reducing agent.

The chamber revolves at a speed of 1 to 1,000 revolutions per minute and more particularly at a speed of 10 to 100 revolutions per minute. When the revolution speed is less than one rpm, the mixing and reducing reaction effects attributed to the revolution are insignificant. Revolution at more than 1,000 rpm generates an excessive centrifugal force that acts on the mixture in the chamber, giving rise to the problems of failing to draw forth uniform mixing and reduction reactions and causing mechanical defects in the chamber.

As the rotary chamber, various types of rotary reactors including rotary kiln reactors may be used without limitations.

The second heat treatment may be carried out at a temperature of 300 to 1,000° C. for 1 to 24 hours under a pressure of $10^{-3}$ to 5 bar and particularly at a temperature of 650 to 800° C. under a pressure of $10^{-2}$ to 2 bar for 2 to 5 hours in a non-oxidative atmosphere. A temperature less than n 300° C. for the secondary heat treatment does not melt the metal reducing agent and fails in uniform reduction and reaction heat control, with a resultant decrease in the reduction rate of the silicon precursor and the yield of the porous silicon. When the secondary heat treatment is carried out at higher than 1,000° C., the particles undergo sintering to increase the diameter of the primary silicon particles and the pores are not sufficiently formed. At such a temperature, side reactions occur to decrease the purity of the porous silicon. The heat treatment temperature may be set forth in a suitable range depending on the metal reducing agent used and, in consideration of the melting point (Tm) of the metal reducing agent, may particularly range from $T_m$ to $T_m+250°$ C.

According to temperature and pressure conditions, the reducing agent may participate in metallothermic reduction as a vapor or liquid phase.

The non-oxidative atmosphere may be an oxygen-free atmosphere like inert gas, such as argon, etc., or a mixture of inert gas and hydrogen. Under this condition, the silicon precursor can be reduced by the metal reducing agent in a liquid- or gas-phase state.

In step (4), the reduction product obtained by the secondary heat treatment is washed to recover porous silicon. The reaction product obtained by the secondary heat treatment may include unreacted silicon precursor and metal reducing agent and by-products such as magnesium silicide ($Mg_2Si$), etc. in addition to porous silicon and oxidized metal reducing agent. A washing process with water and an acidic solution removes the heat dispersant, by-products, and unreacted silicon precursors from the reaction product while recovering the porous silicon.

In an embodiment according to the present disclosure, the step of washing and etching the reaction product to recover porous silicon may include the sub-steps of: (4-1) washing the reaction product with distilled water to remove the heat dispersant; (4-2) washing the reaction product with a first acidic solution to remove by-products; and etching the reaction product with a second acid solution to remove remaining silicon precursors.

The first and the second acidic solution may each be independently hydrochloric acid (HCl), acetic acid, hydrofluoric acid (HF), or a combination thereof.

The water used in the washing step (4-1) is distilled water. This washing step is carried out for 1 to 10 hours and particularly for 4 to 6 hours.

The first acidic solution used in the washing step (4-2) is limited to specific types, but may be particularly hydrochloric acid. This step may be carried out for 1 to 10 hours using the first acid solution at a concentration of 0.01 to 8 M and particularly for 4 to 6 hours using the first acid solution at a concentration of 0.05 to 5 M. when the concentration of the first acidic solution is less than 0.01 M, the by-products are insufficiently removed. At higher than 8 M, the first acidic solution vaporizes to generate harmful gas which corrodes the working environment and is hazardous to the worker.

No limitations are imparted to the second acidic solution used in the etching step (4-3). Preferable is hydrofluoric acid (HF). This step may be carried out for 1 to 10 hours using the secondary acidic solution at a concentration of 0.1 to 40 v/v % based on the total volume thereof and particularly for 4 to 6 hours using the secondary acidic solution at a concentration of 0.5 to 20 v/v % based on the total volume thereof. When the second acidic solution has a concentration of less than 0.1 v/v %, the remaining silicon precursor is insufficiently removed. At a concentration of 40 v/v % or higher, the second acidic solution vaporizes to form harmful gas that corrodes the working environment and is hazardous to the worker. The porous silicon recovered after the washing and etching processes suggested in steps (4-2) to (4-3) has a specific surface area of 20 to 200 $m^2/g$ and a total pore volume of 0.1 to 1.0 $cm^3/g$ as measured by a BET method, and the primary silicon particles as a constituent for the porous silicon may range in average diameter from 10 to 50 nm.

In addition, the present disclosure provides a method for producing a secondary battery anode active material including a porous silicon-carbon composite in which the porous silicon manufactured by the porous silicon manufacturing method is coated with carbon.

Figure 4:
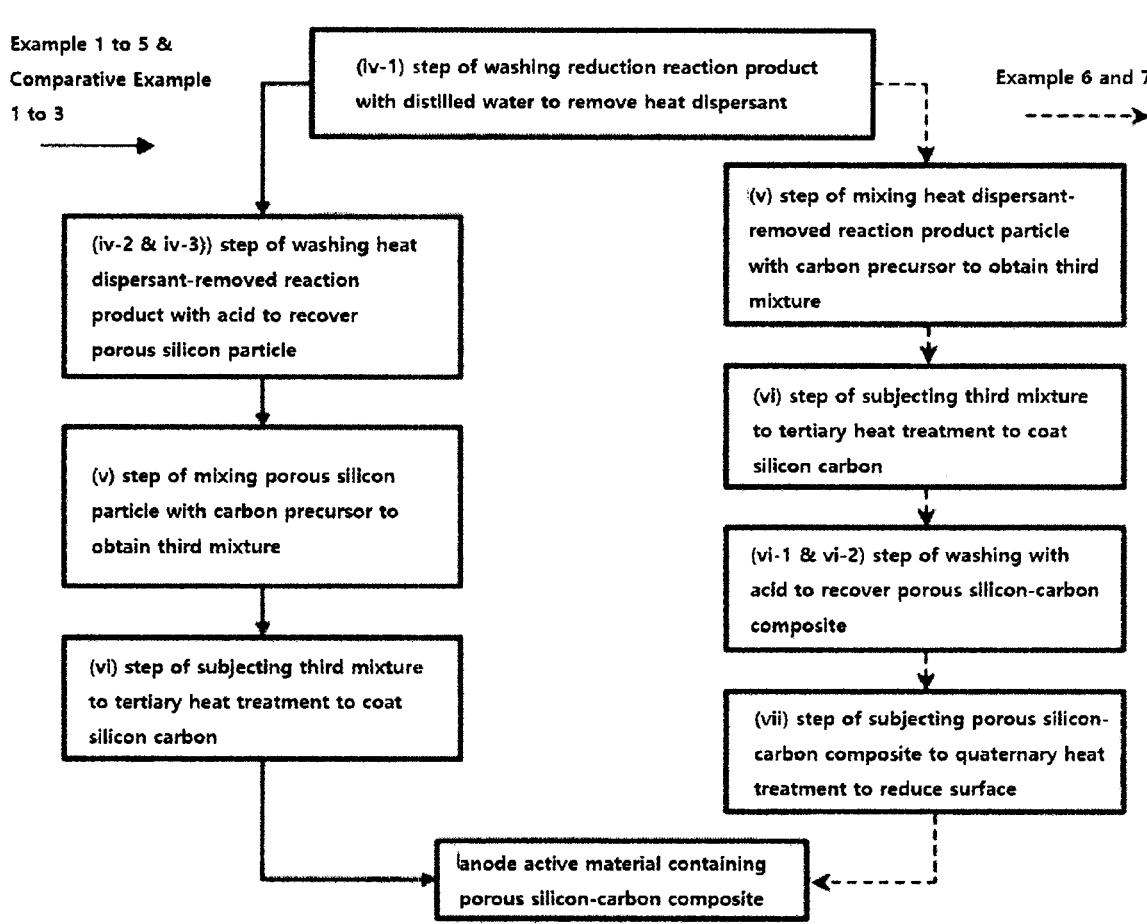
FIG. 4 illustrates a method for producing anode active materials including porous silicon-carbon composites according to Examples 1 to 7 and Comparative Examples 1 to 3.

With reference to FIG. 4, a method for producing a secondary battery anode active material including the porous silicon-carbon composite is illustrated according to an embodiment, the method, after sequentially conducting the steps (4-1) to (4-2) on the porous silicon manufactured through the steps (1) to (3), including the steps of (5) mixing the porous silicon with a carbon precursor to form a third mixture; and (6) subjecting the third mixture to tertiary heat treatment.

In the method for manufacturing a secondary battery anode active material including a porous silicon-carbon composite, the porous silicon recovered in step (4) is coated with a carbonaceous material through mixing and heat treatment.

Figure 5:
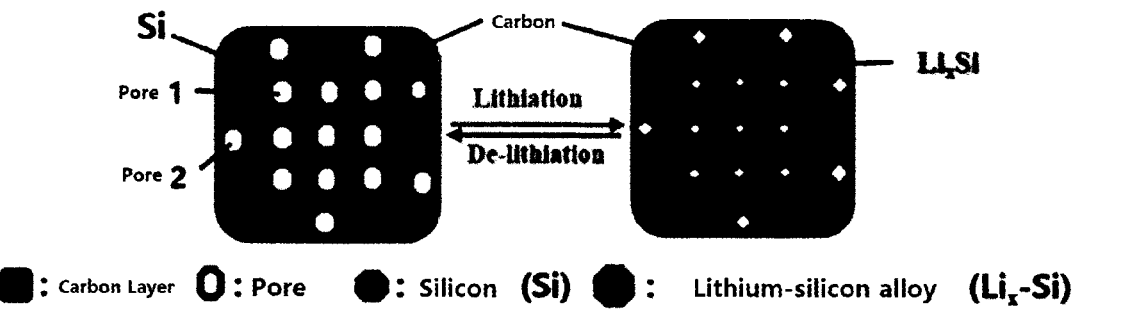
FIG. 5 is a schematic view illustrating the structural stability of the porous silicon-carbon composite used as a lithium secondary battery anode active material wherein pores (pore 1) in the porous silicon particles and pores (pore 2) in the carbon layer effectively absorb volumetric expansion during repeated cycles of charging (lithiation) and discharging (de-lithiation).

FIG. 5 is a view showing the structural stability of a porous silicon-carbon composite manufactured according to an embodiment of the present disclosure in a secondary battery including the porous silicon-carbon composite during charging (lithiation) and discharging (de-lithiation). Referring to FIG. 5, volumetric expansion of the porous silicon-carbon composite is absorbed by cavity 1 inside the porous silicon and cavity 2 in the carbon while the carbon coat on the porous silicon increases electric conductivity and allows for reversible lithiation and de-lithiation, whereby the porous silicon-carbon composite exhibits excellent lifespan characteristics as an electrode material for secondary batteries. Even when changing in volume during charging and discharging, the primary silicon particles minimize the overall volumetric expansion of the porous silicon-carbon composite.

The carbon precursor applied on the porous silicon may include at least one of pitch, sucrose, glucose, resorcinol-formaldehyde, phenol-formaldehyde, a phenolic resin, polydopamine, graphite, carbon black, carbon nanotubes, and graphene.

The tertiary heat treatment may be carried out at 600 to 1000° C. and particularly at 700 to 900° C. in an inert gas atmosphere or in a mixed atmosphere of inert gas and hydrogen. When the tertiary heat treatment is conducted at less than 600° C., the carbon precursor, which is a constituent of the secondary battery electrode, forms underdeveloped carbon hexahedrons and carbon layers so that the battery exhibits a poor cycle characteristic although increasing in capacity. In contrast, at a temperature higher than 1,000° C. for the tertiary heat treatment, the carbon precursor increases in crystallinity with the removal of hydrogen atoms therefrom, causing the battery to increase in cycle characteristic but to decrease in capacity.

The content of the porous silicon in the porous silicon-carbon composite may be 10 to 80 wt %, based on the total weight of the porous silicon-carbon.

Turning to FIG. 4, a method for producing a secondary battery anode active material is illustrated according to another embodiment of the present disclosure, the method, after conducting the step (4-1) on the porous silicon manufactured through the steps (1) to (3), including the steps of: (5) mixing the porous silicon with a carbon precursor to form a third mixture; (6) subjecting the third mixture to tertiary heat treatment to afford the secondary battery anode active material containing a porous silicon-carbon composite; (4-2) washing the secondary battery anode active material with a first acidic solution to remove by-products; (4-3) etching the secondary battery anode active material with a second acidic solution to remove remaining silicon precursors; and (7) subjecting the secondary battery anode active material containing the porous silicon-carbon composite to a quaternary heat treatment to additionally reduce the surface of the active material.

The quaternary heat treatment in step (7) may be conducted at 600 to 1,000° C. and particularly at 700° C. to 900° C. in an inert gas atmosphere or a mixed atmosphere of inert gas and hydrogen. When the quaternary heat treatment is conducted at less than 600° C., the reduction is insufficient. A temperature higher than 1,000° C. causes side reactions.

The content of the porous silicon in the porous silicon-carbon composite may range from 10 to 80 wt %, based on the total weight of the porous silicon-carbon composite.

The porous silicon-carbon composite-containing secondary battery anode active material according to the present disclosure can be used as an electrode for a secondary battery. The electrode can be also a constituent in power storage devices and electric devices in addition to secondary batteries. However, the use of the porous silicon-carbon composite-containing secondary battery anode active material is not limited to those described in the specification. No particular limitations are imparted into the uses of the anode active material if the secondary battery inclusive of an electrode containing the anode active material is a component in power supply systems. In detail, the electronic device may be a mobile device such as an electric vehicle, a smartphone, a watch, etc. The electronic device may include electronic parts such as microprocessors, etc., and may be designed to operate the electronic parts while receiving power from the secondary battery.

A better understanding of the present disclosure may be obtained through the following Examples in which the steps were performed in the order of descriptions. In order to help the understanding of the temporal execution order in the examples, a series of numbers in parentheses are given according to the execution order, indicating performing specific steps described therein.

[Examples 1 to 7] Production of Secondary Battery Anode Active Material Containing Porous Silicon-Carbon Composite Example 1

1. Step (1): Mixing Zeolite as Silicon Precursor and Sodium Chloride as Heat Dispersant, Followed by Heat Treatment A uniform mixture was made at a ratio of 10 parts by weight of zeolite Y ($SiO_2/Al_2O_3$=80) to 100 parts by weight of sodium chloride powder in an aqueous state, and then the solvent was evaporated. To remove moisture and hydroxyl groups (—OH) inside the pores of the zeolite, a primary heat treatment was carried out at 700° C. for 5 hours. As a result, a first mixture of zeolite and sodium chloride was obtained.

2. Steps (2) to (4-3): Recovery of Porous Silicon Through Washing and Etching Subsequent to Rotary Thermal Reduction Together with 0.8 g of magnesium powder, 11 g of the mixture of zeolite Y and sodium chloride (weight ratio of zeolite:sodium chloride=1:10 wt %) obtained in step (1) was physically mixed and the mixture was dried at 250° C. for 15 hours in a vacuum.

This mixture was loaded into a reaction chamber made of a closed Swagelok tube under an argon atmosphere in a glove box and subjected to secondary heat treatment at 750° C. for 2 hours to perform magenesiothermic reduction while rotating the chamber at a speed of 3.5 rpm under 1 bar in a nitrogen atmosphere.

The reaction product obtained as a brown powder by the heat treatment was primarily washed with distilled water to remove the heat dispersant sodium chloride and then with 1 M HCl for an additional 5 hours to remove by-products such as magnesium oxide (MgO) or magnesium silicide ($Mg_2Si$).

The silicon precursor remaining incompletely reduced was removed by etching with 5 v/v % HF for 5 hours to recover porous silicon.

3. Steps (5) to (6): Production of Secondary Battery Anode Active Material Containing Porous Silicon-Carbon Composite Obtained by coating porous silicon with carbon The recovered porous silicon was completely dispersed in tetrahydrofuran (THF) by ultrasonic vibration. Pitch carbon was completely dissolved in THF by ultrasonic vibration and stirring and then added with the dispersion of the porous silicon in THF.

The mixture was stirred at room temperature for 3 hours and then at 70 to 80° C. until the solvent completely vaporized. The porous silicon-carbon precursor mixture thus obtained was dried at 80° C. for 12 hours in a drier, subjected to tertiary heat treatment at 800° C. for 4 hours under a flow of argon gas in a tube heater, and then let to be cooled spontaneously. In this regard, the porous silicon-carbon composite was made to have a silicon content of 41 wt %.

Example 2

A porous silicon-carbon composite was produced in the same manner as in Example 1, with the exception that the secondary heat treatment in step (3) was carried out at 750° C. for 5 hours.

Example 3

A porous silicon-carbon composite was produced in the same manner as in Example 1, with the exception that the secondary heat treatment was carried out while the rotary reaction chamber in step (3) was rotated at a speed of 17 rpm.

Example 4

A porous silicon-carbon composite was produced in the same manner as in Example 1, with the exception that the secondary heat treatment was carried out at 750° C. for 5 hours while the rotary reaction chamber in step (3) was rotated at 17 rpm, and the etching process with hydrochloric acid solution in step (4) was not conducted.

Example 5

A porous silicon-carbon composite was produced in the same manner as in Example 1, with the exception that the secondary heat treatment was carried out at 750° C. for 5 hours while the rotary reaction chamber in step (3) was rotated at a speed of 17 rpm.

Example 6

Step (1): Mixing Zeolite as Silicon Precursor and Sodium Chloride as Heat Dispersant, Followed by Heat Treatment A uniform mixture was made at a ratio of 10 parts by weight of zeolite Y (SiO$_2$/Al$_2$O$_3$=80) to 100 parts by weight of sodium chloride powder in an aqueous state, and then the solvent was evaporated. To remove moisture and hydroxyl groups (—OH) inside the pores of the zeolite, a primary heat treatment was carried out at 700° C. for 5 hours. As a result, a first mixture of zeolite and sodium chloride was obtained.

Steps (2) to (4-1): Recovery of Porous Silicon Through Rotary Thermal Reduction and Washing with Water Together with 0.8 g of magnesium powder, 11 g of the mixture of zeolite Y and sodium chloride (weight ratio of zeolite:sodium chloride=1:10 wt %) obtained above was physically mixed and the mixture was dried at 250° C. for 15 hours in a vacuum.

This mixture was loaded into a reaction chamber made of a closed Swagelok tube under an argon atmosphere in a glove box and subjected to secondary heat treatment at 750° C. for 2 hours to perform magenesiothermic reduction while rotating the chamber at a speed of 3.5 rpm under 1 bar in a nitrogen atmosphere.

The reaction product obtained as a brown powder by the heat treatment was primarily washed with distilled water to remove the heat dispersant sodium chloride.

Steps (5) to (6): Preparation of Porous Silicon-Carbon Composite by Coating Porous Silicon with Carbon The porous silicon-containing brown mixture deprived of the heat dispersant was completely dispersed in tetrahydrofuran (THF) by ultrasonic vibration. Pitch carbon was completely dissolved in THF by ultrasonic vibration and stirring and then added with the dispersion of the porous silicon in THF.

The mixture was stirred at room temperature for 3 hours and then at 70 to 80° C. until the solvent completely vaporized. The porous silicon-carbon precursor mixture thus obtained was dried at 80° C. for 12 hours in a drier. The dried powder was input into a jar and subjected to tertiary heat treatment at 650° C. for 5 hours under a flow of argon gas in a tube heater, and then let to be cooled spontaneously. In this regard, the porous silicon-carbon composite was made to have a silicon content of 41 wt %.

Steps (6-1) to (6-2): Recovery of Washed and Etched Porous Silicon-Carbon Composite While being stirred at 60° C. for 15 hours in silicon oil, the silicon-carbon composite obtained above was pickled with 2 M HCl to remove by-products such as magnesium oxide (MgO) or magnesium silicide (Mg$_2$Si). The silicon precursor remaining incompletely reduced was removed by etching with 5 v/v % HF for 5 hours to recover porous silicon.

Step (7): Surface Reduction of Porous Silicon-Carbon Composite

The washed and etched porous silicon-carbon composite was loaded into a jar and then subjected to quaternary heat treatment at 800° C. for 4 hours under a flow of argon gas in a tube heater, followed by spontaneously cooling.

Example 7

The surface-reduced porous silicon-carbon composite obtained in Example 6 and graphite were mixed at a weight ratio of 50:50 wt % to prepare a secondary battery anode active material containing the porous silicon-carbon composite.

[Examples 8 to 10] Fabrication of Lithium Secondary Battery

Example 8

Electrode Preparation Step

Use was made of the porous silicon-carbon composite of Example 4 as an anode active material for a secondary battery, carbon black as a conductive material, and a 5 wt % polyvinyl acetate (PVA) solution in dimethyl sulfoxide (DMSO) as a polymer binder. The porous silicon-carbon composite, the conductive material, and the polymer binder were mixed at a weight ratio of 70:20:10 to give a mixture in a slurry state.

The mixture in a slurry state was applied at a thickness of 30 μm to a 10 μm-thick copper plate as a copper current collector, dried at 80° C. for 2 hours, and compressed into a thickness of 10 μm. The compressed current collector was dried at 80° C. for 2 hours in a vacuum to afford an anode active material-containing secondary battery anode with an area of 1.54 cm$^2$.

Anode Deposition and Separator Input Step

Under an argon atmosphere in a glove box, the secondary battery anode and the lithium metal reference electrode were deposited on a 2032 coin cell, with a 2.54 cm$^2$ polypropylene (PP) separator inserted therebetween.

Fabrication of Lithium Secondary Battery Subsequent to Preparation of Electrolyte A lithium secondary battery was fabricated using as an electrolyte a 10 vol % fluoroethylene carbonate-added solution in which ethylene carbonate, ethylmethyl carbonate, and diethyl carbonate were mixed at a volume ratio of 30:40:30 in an organic solvent containing 1.2M LiPF$_6$ salt.

Example 9

A lithium secondary battery was fabricated in the same manner as in Example 8, with the exception that the porous silicon-carbon composite of Example 6 was used, instead of that of Example 4, as an anode active material for a secondary battery.

Example 10

A lithium secondary battery was fabricated in the same manner as in Example 8, with the exception that the porous silicon-carbon composite of Example 7 was used, instead of that of Example 4, as an anode active material for a secondary battery.

[Comparative Examples 1 to 3] Production of Porous Silicon-Carbon Composite-Containing Secondary Battery Anode Active Material

Comparative Example 1

A porous silicon-carbon composite-containing secondary battery anode active material was produced in the same manner as in Example 2, with the exception that the magnesiothermic reduction was carried out by the secondary heat treatment while the rotary reaction chamber was not rotated, but in a stagnant state. In this regard, the porous silicon-carbon composite was made to have a silicon content of 60 wt %.

Comparative Example 2

A porous silicon-carbon composite-containing secondary battery anode active material was produced in the same manner as in Example 2, with the exception that the magnesiothermic reduction was carried out in a vacuum by the secondary heat treatment while the rotary reaction chamber was not rotated, but in a stagnant state.

Comparative Example 3

A porous silicon-carbon composite-containing secondary battery anode active material was produced in the same manner as in Example 3, with the exception that the magnesiothermic reduction was carried out by physically mixing sodium chloride and magnesium powder after the primary heat treatment on zeolite Y alone at 700° C. for 5 hours.

<Comparative Example 4> Production of Commercially Available Silicon-Carbon Composite-Containing Secondary Battery Anode Active Material A commercially available porous silicon-carbon composite-containing secondary battery anode active material was produced in the same manner as in Example 1, with the exception that commercially available silicon nanoparticles with a particle size of 70 to 100 nm were used instead of the porous silicon. In this regard, the porous silicon-carbon composite was made to have a silicon content of 56 wt %.

<Comparative Example 5> Fabrication of Lithium Secondary Battery

A lithium secondary battery was fabricated in the same manner as in Example 8, with the exception that the commercially available silicon-carbon composite of Comparative Example 4 was used, instead of the porous silicon-carbon composite of Example 4, as an anode active material for a secondary battery.

Compositions of raw materials, magnesiothermic reduction conditions, and carbon composite manufacturing conditions in the Examples are summarized in Table 1 while those in the Comparative Examples are given in Table 2, below.

TABLE 1

| | | Example | | | | | | |
|---|---|---|---|---|---|---|---|---|
| | | 1 | 2 | 3 | 4 | 5 | 6 | 7 |
| Condition for manufacturing porous silicon | Pressure in reaction chamber (at room temperature) | | | | 1 bar | | | |
| | Revolution speed of reaction chamber(rpm) | 3.5 | 3.5 | 17 | 17 | 17 | 3.5 | 3.5 |
| | Rxn. Temp (° C.) | | | | 750 | | | |
| | Rxn. Time (h) | 2 | 5 | 2 | | | 5 | |

TABLE 1-continued

| | | Example | | | | | | |
|---|---|---|---|---|---|---|---|---|
| | | 1 | 2 | 3 | 4 | 5 | 6 | 7 |
| | Primary Si particle size (nm) | 36.3 | 48.4 | 34.1 | 32.6 | 35.6 | 43.6 | 43.6 |
| | Experimental Yield (%) | 53.1 | 65.7 | 75.5 | 89.5 | 71.9 | 65.7 | 65.7 |
| | MgO conversion rate (%) | — | 76.6 | 81.3 | 92.9 | 92.9 | 76.6 | 76.6 |
| Condition for producing porous silicon-carbon composite | Silicon type | | | | porous silicon | | | |
| | Carbon precursor type | | | | Carbon pitch | | | |
| | Si content in composite (wt %) | 40 | 39 | 40 | 40 | 40 | 39 | 39 |
| Weight ratio of electrode active materials | Porous silicon-carbon composite (A) | 100 | 100 | 100 | 100 | 100 | 100 | 50 |
| | Graphite (B) | — | — | — | — | — | — | 50 |
| (wt %) | Sum (A + B) | 100 | 100 | 100 | 100 | 100 | 100 | 100 |
| | Si content in electrode active material | 40 | 39 | 40 | 40 | 40 | 39 | 19.5 |

TABLE 2

| | | Comparative Example | | | |
|---|---|---|---|---|---|
| | | 1 | 2 | 3 | 4 |
| Condition for manufacuring porous silicon | Pressure in reaction chamber (at room temperature) | 1 bar | Vacuum | 1 bar | — |
| | Revolution speed of reaction chamber(rpm) | — | — | 17 | — |
| | Rxn. Temp (° C.) | 750 | 750 | 750 | — |
| | Rxn. Time (h) | 5 | 5 | 5 | — |
| | Primary Si particle size (nm) | 30.3 | 12.2 | 26.9 | 11.5 |
| | Experimental Yield (%) | 33.7 | 4.0 | 70.6 | — |
| | MgO conversion rate (%) | 36.9 | — | 64.9 | — |
| Condition for producing porous silicon-carbon composite | Silicon type | | Porous silicon | | Commercially available Si nanoparticles |
| | Carbon precursor type | | | Carbon pitch | |
| | Si content in composite (wt %) | 60 | 60 | 60 | 56 |
| Weight ratio of electrode active materials | Porous silicon-carbon composite (A) | 100 | 100 | 100 | 100 |
| | Graphite (B) | — | — | — | — |
| (wt %) | Sum (A + B) | 100 | 100 | 100 | 100 |
| | Si content in electrode active material | 60 | 60 | 60 | 56 |

Experimental Example: Analysis of Porous Silicon, Porous Silicon-Carbon Composite, and Secondary Battery Containing Same The porous silicon and porous silicon-carbon composites in the Examples and Comparative Examples were analyzed for physical properties including particle diameter and structure, using a field emission scanning electron microscope (FE-SEM, JEOL JSM-35CF operated at 10 kV), a transmission electron microscope (TEM, JEOL JEM-2010, 200.0 kV), a BET specific surface area analyzer, a high-performance X-ray photoelectron spectrophotometer (HP-XPS), and an X-ray diffraction (XRD, Rigaku model D/MAX-50 kV, Cu-K$_\alpha$ radiation, $\lambda$=1.5418 Å) instrument.

<Experimental Example 1> Analysis of SEM Image of Silicon Precursor and TEM Image of Porous Silicon FIG. 6 shows an SEM image of the silicon precursor zeolite Y (a) and a TEM image of the porous silicon particles of Example 4 (b).

Referring to FIGS. 6(*a*) and 6(*b*), it was found that zeolite Y used as a raw material had a particle diameter of 500 nm to 1 μm and exhibited a smooth surface and the porous silicon manufactured in Example 4 retained well-developed porous structures with the primary silicon particles thereof being small in size.

Figure 7:
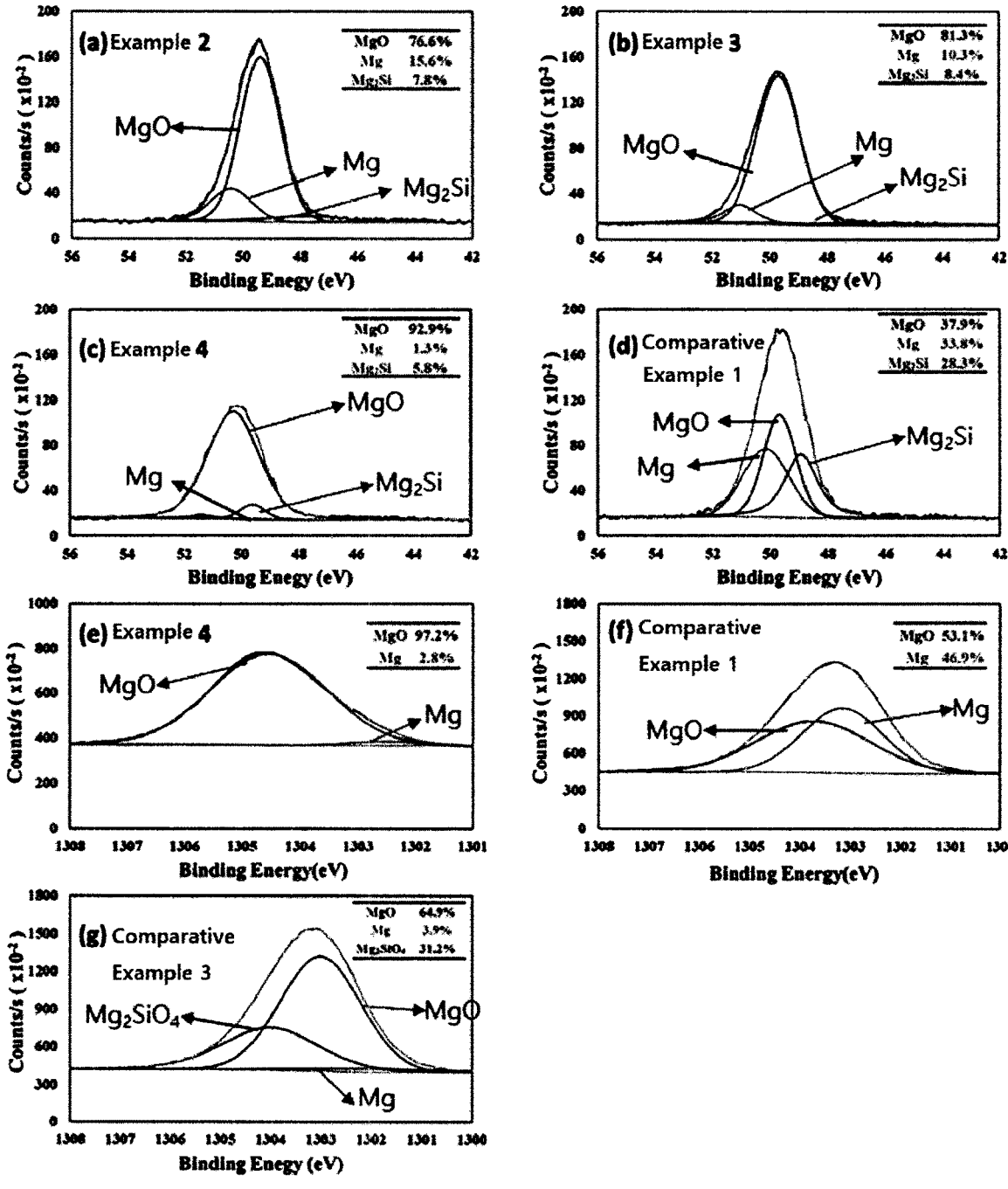
FIG. 7 shows profiles of mixtures of silicon precursors and metal reducing agents after removal of heat dispersants by heat treatment and washing with distilled water, as analyzed by high-performance X-ray photoelectron spectroscopy for dissolving Mg 2p spectra and peaks into MgO, Mg, and $Mg_2Si$ peaks for (a) Example 2, (b) Example 3, (c) Example 4, and (d) Comparative Example 1 and for dissolving Mg is peaks into MgO, Mg, and $Mg_2SiO_4$ peaks for (e) Example 4, (f) Comparative Example 1, and (g) Comparative Example 3.

<Experimental Example 2> XPS and XRD Analysis of Magnesiothermic Reduction Product Obtained by Secondary Heat Treatment The magnesiothermic reduction products obtained in Examples 2 to 4 and Comparative Example 1 were washed with distilled water to remove the heat dispersant and then subjected to XPS Mg 2p spectrometry. Along with the analysis results, conversion rates are depicted in FIG. 7. In addition, conversion rates into individual components in the magnesiothermic reduction products were calculated according Equations 9 to 11 and are shown, together with the experimental yields and the sizes of primary silicon particles, in Table 3 and FIG. 8. Reaction conversion rates were calculated using the Mg 2p analysis results highly sensitive for the mixtures obtained in Examples 2 to 4 and Comparative Example 1 and the Mg is analysis results highly sensitive for $Mg_2SiO_4$ for Comparative Example 3. For comparison therebetween, Mg is analysis results of Example 4 and Comparative Example 1 are depicted in FIG. 7.

$$\text{Conversion rate into Mg 2p reference magnesium} \atop \text{oxide (MgO) (unit: \%)=}(Mg_f-Mg_p)/Mg_f\times \atop (MgO)_p/(MgO_p+Mg_2Si_p)\times100(\%) \qquad \text{(Equation 9)}$$

[$Mg_f$: reactant Mg (at %), $Mg_p$: product Mg (at %), $MgO_p$: product MgO (at %), $Mg_2Si_p$: product $Mg_2Si$ (at %)]

$$\text{Conversion rate into Mg 1s reference magnesium} \atop \text{oxide (MgO) (unit: \%)=}(Mg_f-Mg_p)/Mg_f\times \atop (MgO_p)/(MgO_p+Mg_2SiO_{4p})\times100(\%) \qquad \text{(Equation 10)}$$

[$Mg_f$: reactant Mg(at %), $Mg_p$: product Mg(at %), $MgO_p$: product MgO(at %), $Mg_2SiO_{4p}$: product Mg2Si (at %)]

$$\text{Experimental yield of porous silicon (Exp. Yield,} \atop \text{unit: \%)=[recovered porous silicon (g)]/[weight} \atop \text{of silicon in silicon precursor (g)]\times100(\%)} \qquad \text{(Equation 11)}$$

TABLE 3

| | XPS Mg2p Yield(%) | Exp. Yield(%) | Size (nm) |
|---|---|---|---|
| Example 1 | — | 53.1 | 36.3 |
| Example 2 | 76.6 | 65.7 | 48.4 |
| Example 3 | 81.3 | 75.5 | 34.1 |
| Example 4 | 92.9 | 89.5 | 32.6 |
| Example 5 | 92.9 | 71.9 | 35.6 |
| C. Example 1 | 36.9 | 33.7 | 30.3 |
| C. Example 2 | — | 4.2 | 12.2 |
| C. Example 3 | 64.9 | 70.6 | 26.9 |

With reference to FIGS. 7(*a*), 7(*c*), and 7(*d*), when the reaction chamber was rotated at speeds of 3.5 rpm and 17 rpm, the conversion rates to magnesium oxide (MgO) were measured to 76.6% and 92.9% in Examples 2 and 4, respectively, which were 2- to 2.5-fold larger than the conversion rate of 36.9% in Comparative Example 1 where the magnesiothermic reduction was conducted in a stagnant condition. It is understood from the XPS analysis data that the thermic reduction in the rotary reaction chamber is superior to that in a stagnant condition in terms of conversion rate into magnesium oxide (MgO) and represses side reactions.

Referring to FIGS. 7(*b*) and 7(*c*), when the rotation speed of the reaction chamber was increased to 17 rpm, the conversion rates into magnesium oxide (MgO) in Examples 3 and 4 were measured to be 81.3% and 92.9%, respectively, which were increased by 5% to 16%, compared to Example 2.

Figure 8:
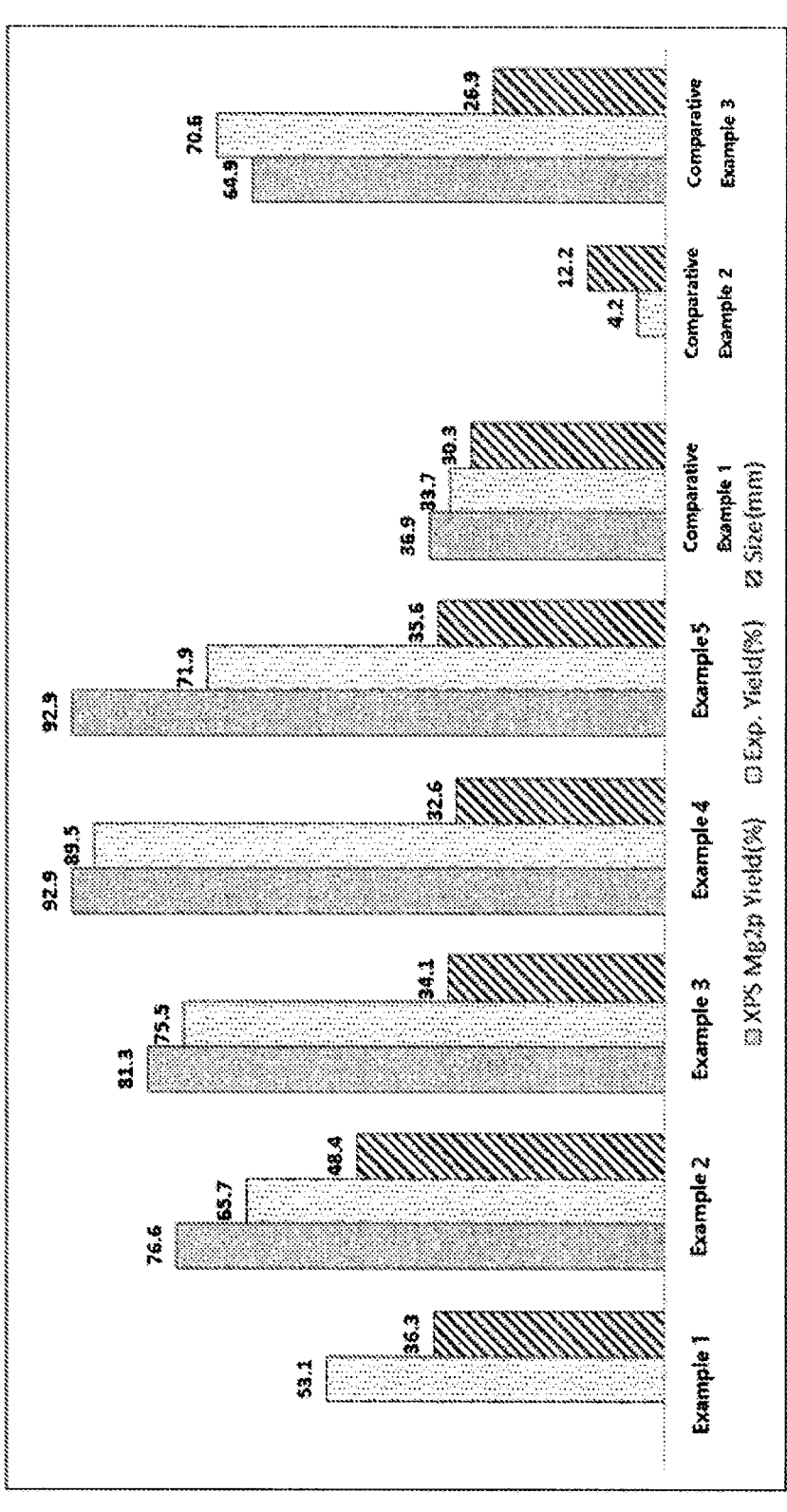
FIG. 8 shows yields of porous silicon as measured by XPS Mg 2P analysis, yields recovered in the experiments, and sizes of primary silicon particles as measured by XRD analysis in Examples 1 to 5 and Comparative Examples 1 to 3.

As shown in FIG. 8, experimental yields of the porous silicon recovered in the Examples and the Comparative Examples were measured to be lower than the conversion rates into magnesium oxide (MgO) due to the loss in the washing steps, etc. When the magnesiothermic reduction was performed while rotating the reaction chamber, the primary silicon particles in the porous silicon were observed to be at least 7% larger than those after the reduction in a stagnant condition, as measured by XRD analysis.

Turning to FIGS. 7(*e*) and 7(*g*), the conversion rate of Comparative Example 1 in which zeolite Y, the heat dispersant (sodium chloride), and the metal reducing agent (magnesium powder) were mixed together and subjected to the reduction was 64.9%, as measured by the Mg is analysis method, which was lower by more than 30% than the conversion rate 97.2% of Example 4 in which a mixture of zeolite Y and the heat dispersant was thermally treated and then mixed with the metal reducing agent before the reduction. This is considered to be attributed to the fact that the mixing order of the silicon precursor, the heat dispersant, and the metal reducing agent affected by-product formation during the reduction process.

In addition, the experimental yield for porous silicon in Comparative Example 3 was 70.6%, which was higher than the conversion rate into magnesium oxide (MgO) due to the fact that stable $MgF_2$ was incorporated into the calculation for the yield of the final product after being formed from $Mg_2SiO_4$ by etching treatment with hydrofluoric acid (HF), as shown in Equation 8. Hence, $MgF_2$ remained as an impurity in the final porous silicon obtained by pickling, thereby decreasing the purity of the final porous silicon product.

<Experimental Example 4> XRD Analysis for Magnesiothermic Reduction Product

Figure 9:
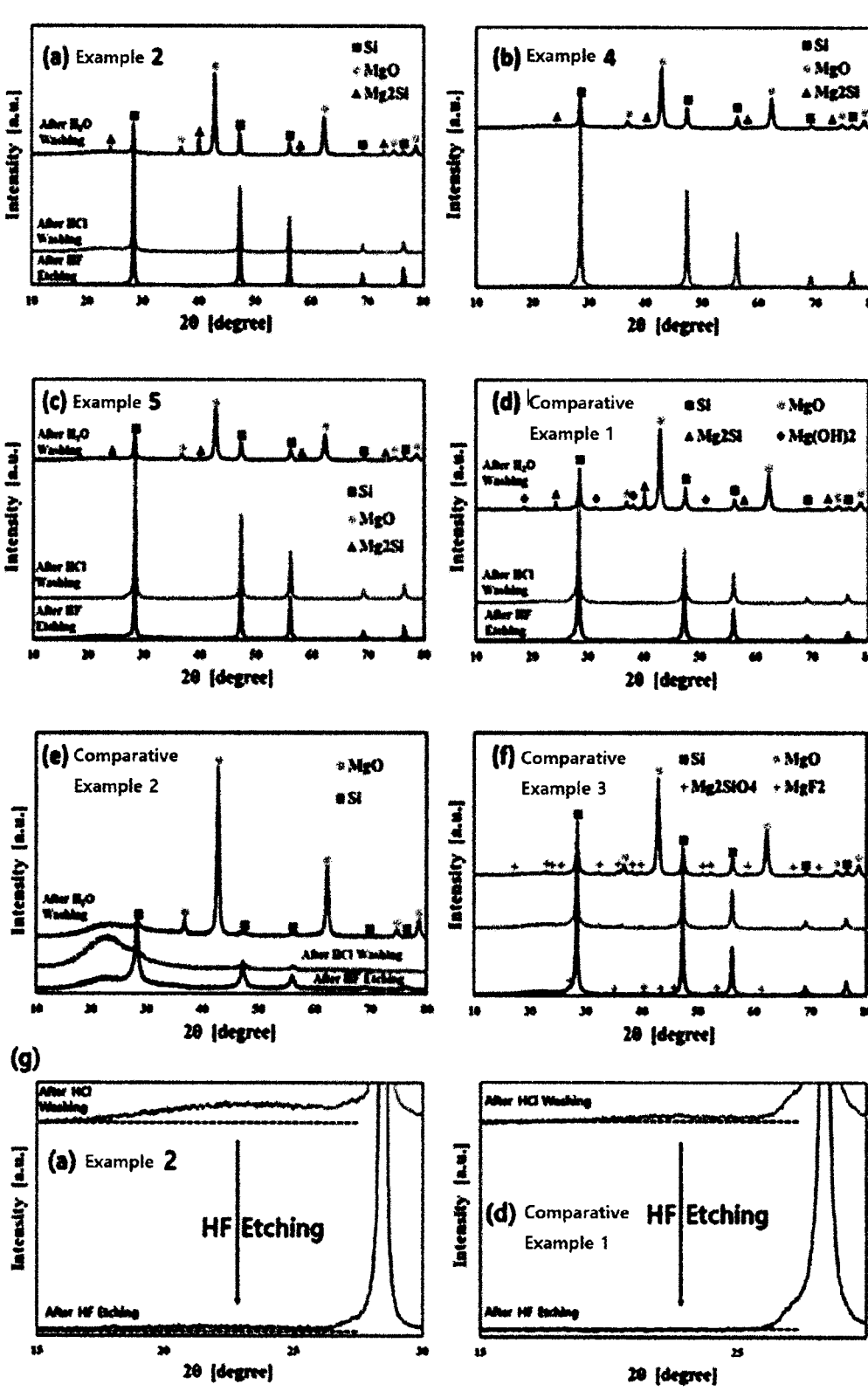
FIG. 9 shows X-ray diffraction (XRD) profiles of porous silicon samples according to manufacturing steps in the Examples and the Comparative Examples [(a) Example 2, (b) Example 3, (c) Example 4, (d) Comparative Example 1, (e) Comparative Example 2, and (f) Comparative Example 3].

X-ray diffraction (XRD) profiles obtained according to washing step in Examples 2 and 4 and Comparative Examples 1 and 2 are depicted in FIG. 9.

With reference to FIGS. 9(*a*) and 9(*b*), a small amount of $Mg_2Si$ was formed as analyzed by XRD for the distilled water-washed reduction product of Example 2 in which the reaction chamber was rotated at a speed of 3.5 rpm (9(a)) while almost little $Mg_2Si$ was formed in Example 4 in which the reaction chamber was rotated at the higher speed of 17 rpm (9(b)). For the porous silicon-carbon composite washed with distilled water and HCl in Example 4, only diffraction peaks for pure silicon crystals ($2\theta=28.4°$, $47.3°$, $56.1°$, $69.1°$, $76.3°$) were observed because the oxidized metal reducing agent (MgO) and by-product ($Mg_2Si$) were removed.

Referring to FIG. 9(*g*) in which the section $2\theta=15\sim30°$ in FIGS. 9(*a*) and 9(*d*) is enlarged, the oxidized metal reducing agent in Example 2 and Comparative Example 1 was removed by pickling with hydrochloric acid (HCl) solution, but since $SiO_2$ was converted from the by-product $Mg_2Si$ according to Equation 6, peaks appeared at $2\theta=15\sim25°$ for amorphous residual silica as measured by XRD for the silica and the silicon precursor remaining unreacted in the thermic reduction. However, no peaks for amorphous silica were observed in the XRD after treatment with hydrochloric acid. In this case, therefore, the amorphous silica was completely removed after the additional etching treatment with hydrochloric acid (HF).

Referring to FIGS. 9(*a*) to 9(*d*), the XRD analysis data indicate that the reduction product washed with distilled water in Comparative Example 1 where the reaction chamber was not rotated contained a larger amount of $Mg_2Si$, compared to the Examples where the reaction chamber was rotated. In addition, MgO and $Mg_2Si$ were more abundant in Example 2 where the rotation speed was 3.5 rpm, compared to Examples 4 and 5 where the rotation speed was 17 rpm. That is, when magnesiothermic reduction is performed through heat treatment under the condition that the reaction chamber is not rotated but stagnant, the conversion rate of the silicon precursor becomes low throughout the inside of the reaction chamber and the reaction molar ratio of $Mg/SiO_2$ exceeds the stoichiometric ratio 2 locally, resulting in the formation of the by-product $Mg_2Si$. In contrast, the rotation of the reaction chamber under the same condition increases the conversion rate of the silicon precursor and makes the reaction molar ratio of $Mg/SiO_2$ uniform across the inside of the chamber, thus repressing the side reaction responsible for the formation of $Mg_2Si$. This effect is considered to be true of the case of increasing the rotation speed.

Referring to FIG. 9(e), Comparative Example 2 where the reduction was performed in a stagnant state under a vacuum condition exhibited diffraction peaks ($2\theta=28.4°$, 47.3°, 56.1°, 69.1°, 76.3°) for silicon crystals at low intensities, but the diffraction peaks at $2\theta=15\sim25°$ for amorphous silica appeared with high intensity according to washing steps, indicating that the conversion rate of the silicon precursor is very poor.

Referring to FIGS. 9(c) and 9(f), peaks were observed for the by-product $Mg_2SiO_4$ in the product of Comparative Example 3 where the silicon precursor, the heat dispersant, and the metal reducing agent were simultaneously mixed together, as opposed to the product of Example 4 where the silicon precursor and the heat dispersant were mixed and then subjected to the primary heat treatment before mixing with the metal reducing agent. The peaks were consistent with the XPS data of FIG. 7(g) accounting for the conversion rate of 31.2% of $Mg_2SiO_4$. This was supported by the observation of peaks for $MgF_2$ instead of $Mg_2SiO_4$ as HCl pickling and HF etching processes were conducted. In contrast to Example 3 in which the silicon precursor (zeolite Y) and the heat dispersant (sodium chloride) were mixed with other and then with magnesium powder, which the silicon precursor, sodium chloride, and magnesium powder were mixed simultaneously in Comparative Example 3. Thus, the mixing order of the silicon precursor, the heat dispersant, and the metal reducing agent or whether the heat dispersant is pretreated or not is considered to affect the formation of by-products in the reduction process.

<Experimental Example 5> TEM Analysis for Porous Silicon

Figure 10:
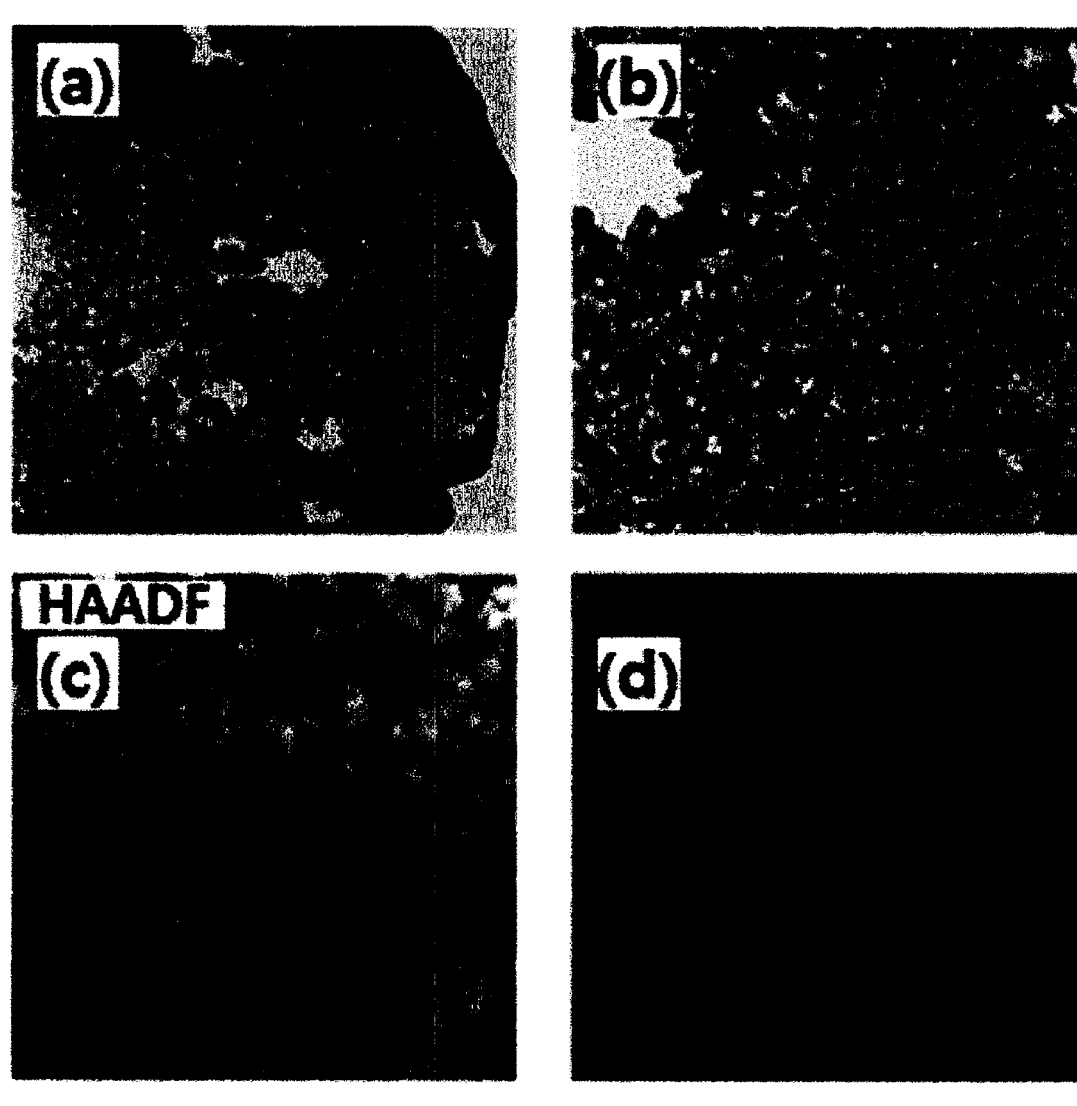
FIG. 10 shows TEM images of focused ion beam (FIB)-cut cross sections of the porous silicon particles obtained in Example 4 (a-c) and a Si element mapping image for the TEM image (d).

TEM images of focused ion beam (FIB)-cut cross sections of the porous silicon particles obtained in Example 4 and Si element mapping images are shown in FIG. 10. Referring to FIGS. 10(a) and 10(b), porous silicon particles were observed to have pores formed therein. With reference to FIG. 10(c) showing a TEM image of high magnification, the primary silicon particles were observed to have a diameter of 30 to 40 nm.

In addition, turning to FIG. 10(d) showing a Si element mapping image for FIG. 10(c), it was observed that small primary silicon particles aggregated and were connected to each other to form large particles which had pores developed therein.

<Experimental Example 6> BET Analysis for Porous Silicon and Porous Silicon-Carbon Composite BET analysis results for the porous silicon-carbon composites obtained in Examples 3, 5, and 6 and the silicon precursor zeolite Y are summarized in Table 4, below.

TABLE 4

| | Example 3 | Example 5 | Example 6 | Zeolite Y |
|---|---|---|---|---|
| BET surface area ($m^2/g$) | 30.6 | 29.9 | 113.9 | 871.0 |
| Pore volume ($cm^3/g$) | 0.17 | 0.17 | 0.43 | 0.52 |
| Adsorption average pore diameter (nm) | 23.3 | 26.6 | 18.2 | 4.4 |

As shown in Table 4, zeolite Y, which was used as a silicon precursor, is a micropore material with a large BET surface area and pore volume. The porous silicon produced from zeolite Y through magnesiothermic reduction in Examples 3 and 5 included mesopores having a BET surface area of 30 $m^2/g$, a pore volume of 0.17 $cm^3/g$, and a mean pore size of 23 to 27 nm.

On the other hand, the porous silicon-carbon composite prepared in Example 6 had a BET surface area of 113.9 $m^2/g$ and a pore volume of 0.43 $cm^3/g$, which were larger than the surface areas and pore volumes of the porous silicon of Examples 3 and 5. The enlargement in surface area and pore volume is construed to result from the formation of pores in the carbon layer as well as the porous silicon in the washing and etching processes after carbon coating. In addition, the average pore size of the porous silicon-carbon composite was decreased to 18.2 nm due to the carbon coating.

<Experimental Example 7> TGA Analysis for Porous Silicon-Carbon Composite

Figure 11:
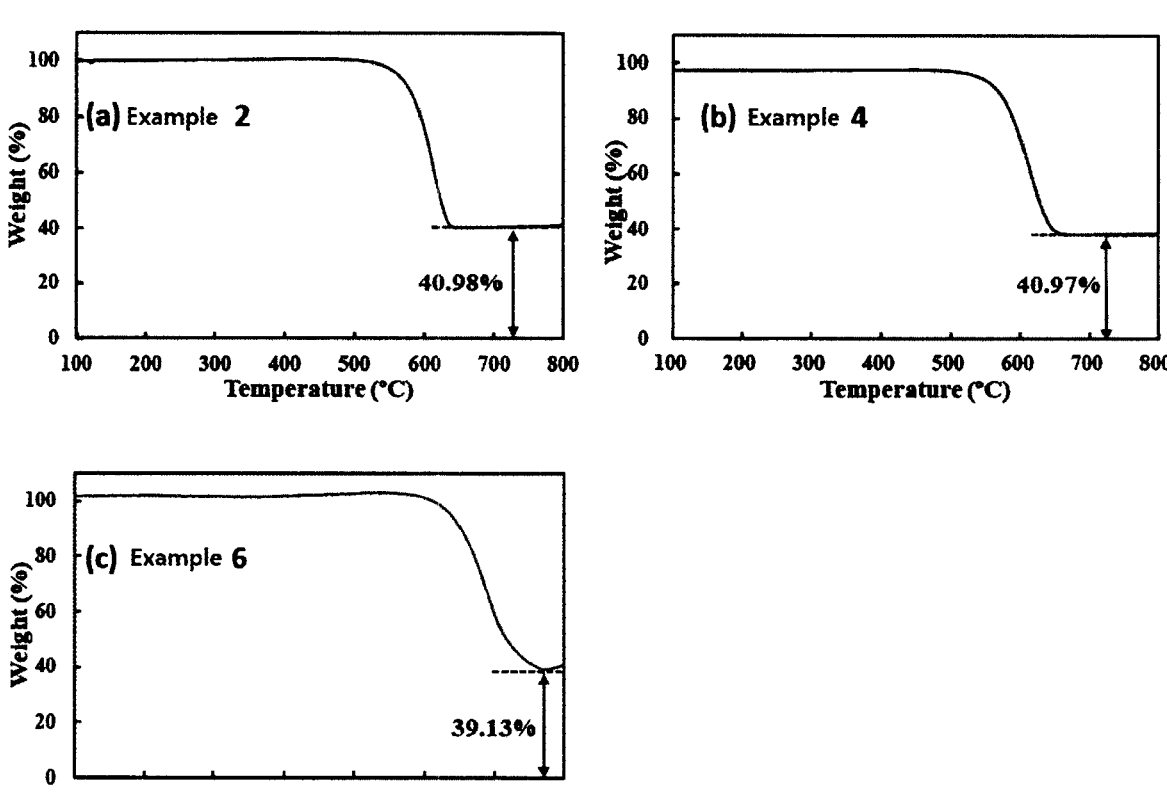
FIG. 11 shows thermogravimetric analysis (TGA) profiles of porous silicon-carbon composites in Examples 2, 4, and 6.

The porous silicon-carbon composites in Examples 2, 4, and 6 were analyzed by TGA in an air atmosphere and the results are depicted in FIG. 11. The composites in Examples 2 and 4 both had a silicon content of 41.0% while the composite prepared in Example 6 includes silicon at a content of 39.1%.

<Experimental Example 8> TEM Analysis for Porous Silicon-Carbon Composite

Figure 12:
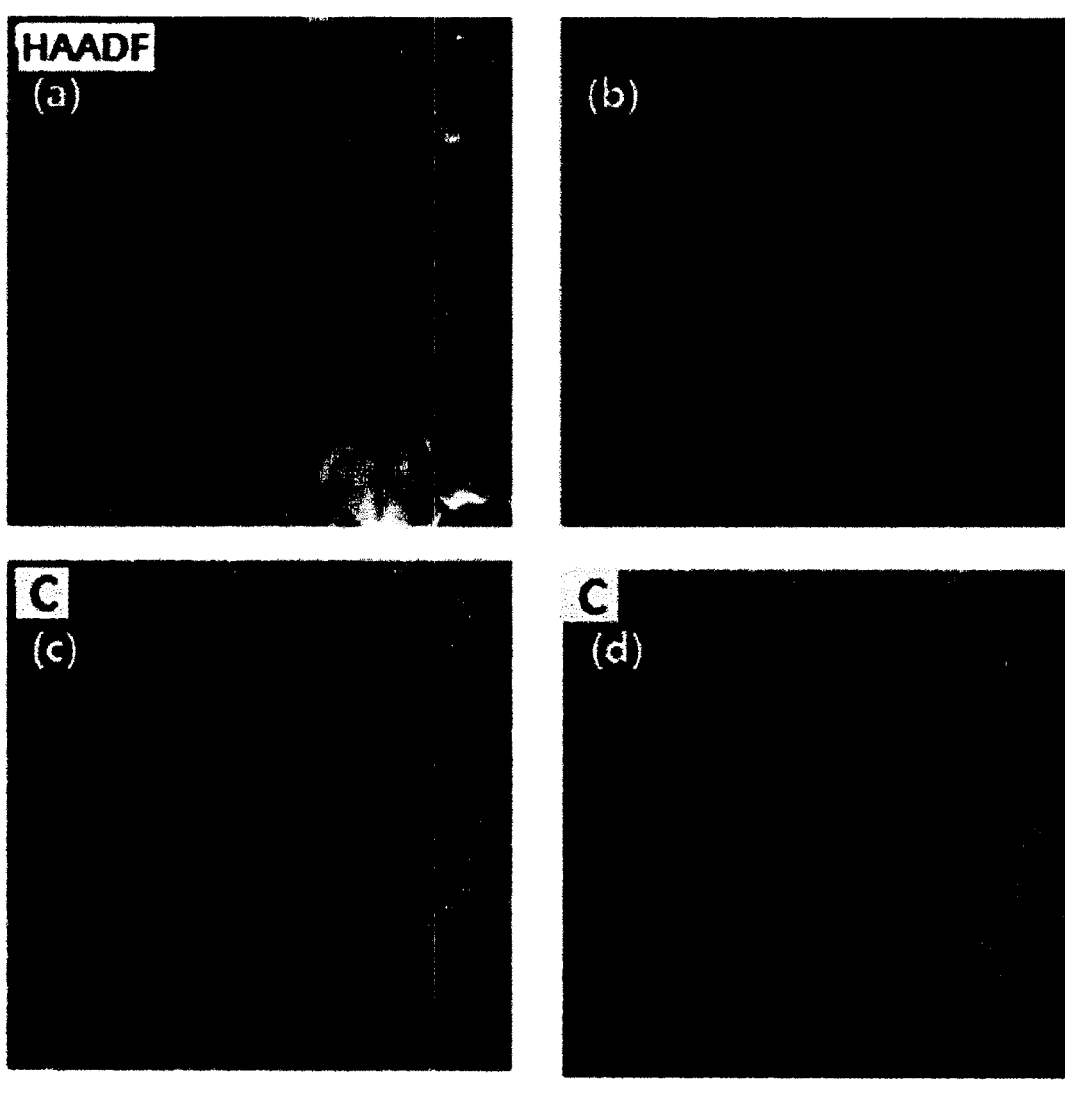
FIG. 12 shows focused ion beam (FIB)-cut cross sections of the porous silicon-carbon composite particles of Example 4 in terms of a TEM image (a), mapping images of carbon (C) (b) and silicon (Si) (c) for the TEM image, and a mapping image of both C and Si elements (d).

The porous silicon-carbon composite obtained in Example 4 was examined for the distribution of silicon and carbon over the inside and outside thereof. In this regard, the composite was cut with FIB and the cross sections thus exposed were analyzed by TEM and subjected to element mapping. The results are depicted. With reference to FIG. 12(d), there is an image obtained after carbon (C) and silicon (Si) were simultaneously mapped. As shown, the porous silicon-carbon composite is uniformly coated with carbon across the inside and outside thereof.

Figure 13:
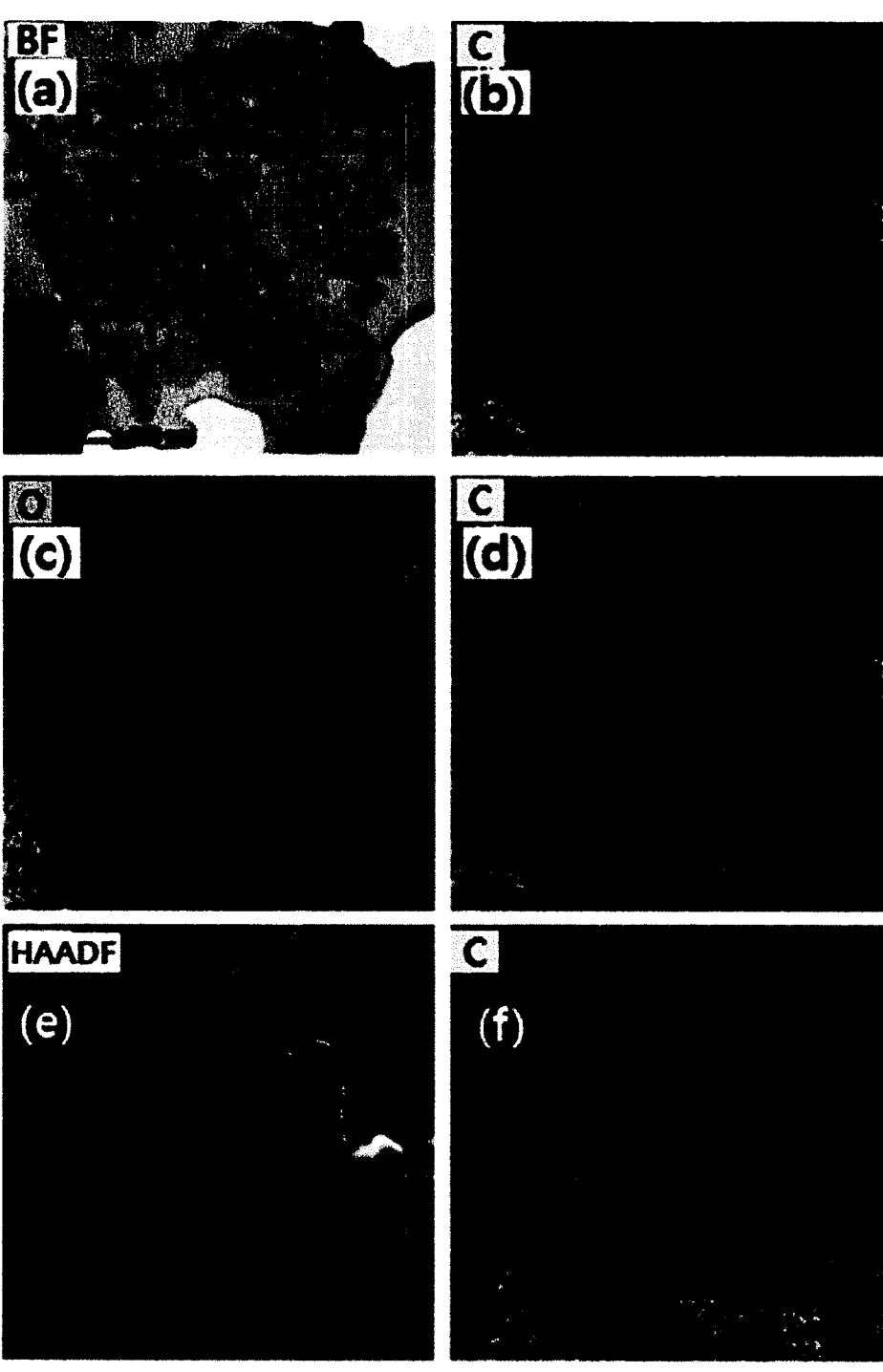
FIG. 13 shows focused ion beam (FIB)-cut cross sections of the porous silicon-carbon composite particles after removal of the heat dispersant by washing the reduction product with distilled water and coating same with carbon in Example 6, in terms of a TEM image (a), a mapping image of all of carbon (C), magnesium (Mg), and silicon (Si) elements (b), a mapping image of both magnesium (Mg) and oxygen (O) elements (c), and a mapping image of both carbon (C) and silicon (Si) elements (d) for the TEM image, and a TEM image (e) and a mapping image of both carbon (C) and silicon (Si) (f) after removal of MgO with hydrochloric acid solution.

The cross sections of the composite obtained in Example 6 were analyzed using TEM in the same manner as for Example 4. The results are depicted in FIG. 13. In Example 6, unlike Example 4, the reduction product was washed with distilled water to remove only the heat dispersant, followed by carbon coating. That is, the porous silicon and the reduction product MgO were present in the mixture and after carbon coating, pickling with HCl removed MgO. Referring to FIGS. 13(a) to 13(c), which are images of the porous silicon-carbon composite after carbon coating, the carbon coat layer was distributed mainly over the outer surface of the composite while MgO, a constituent of the oxidized metal reducing agent, was uniformly distributed in the inside. As shown in FIGS. 13(e) and 13(f), the porous silicon-carbon composite pickled with hydrochloric acid solution after carbon coating retained the carbon coat layer and the porous silicon while MgO distributed inside the particles was removed. Accordingly, the carbon coat layer was distributed mainly on the outside of the particles while the porous silicon was found predominantly inside the particles. In other words, the porous silicon-carbon composite prepared in Example 6 had more pores distributed therein, compared to that prepared in Example 4 where carbon coating was performed after preparation of the porous silicon.

<Experimental Example 9> Analysis for Electrochemical Characteristics of Lithium Secondary Battery To analyze electrochemical characteristics of the lithium secondary battery, charge/discharge cycles were measured in the voltage range of 0.01 to 1.5 V by a constant current method.

Figure 14:
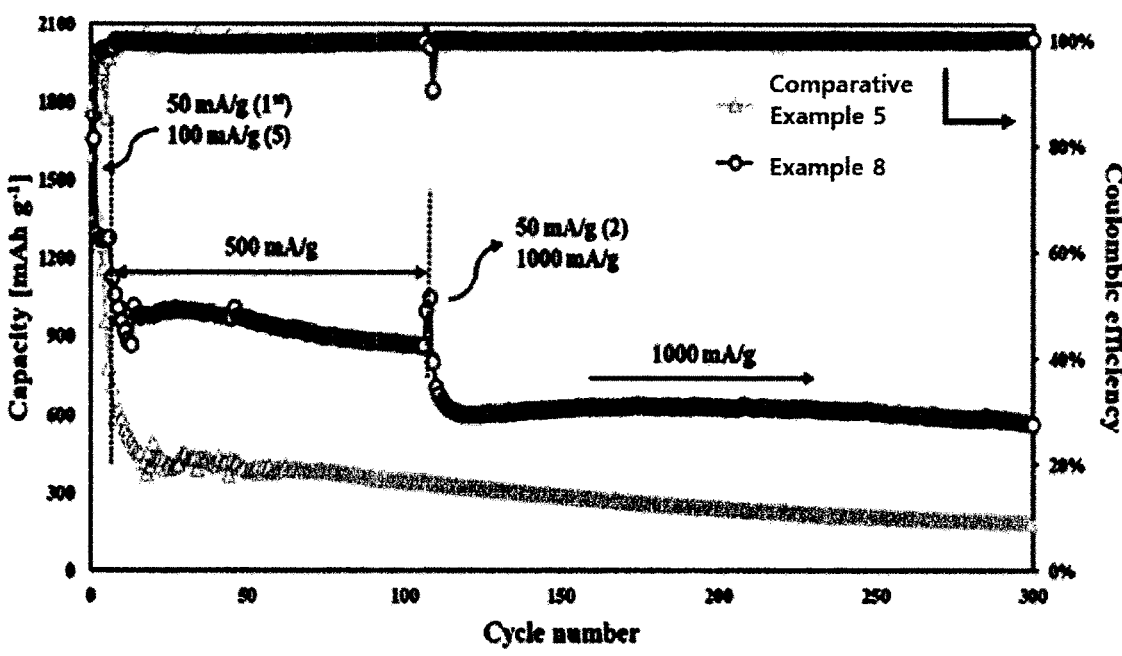
FIG. 14 is a graph showing charge/discharge cycle performance of the lithium secondary batteries of Example 8 and Comparative Examples 5.

FIG. 14 shows a comparison of charge/discharge cycle characteristics between lithium secondary batteries of Example 8 and Comparative Examples 5. Charge/discharge cycle tests started with one cycle at a current density of 50 mA/g and proceeded with five cycles at a current density of 100 mA/g, and subsequent cycles were performed at a current density of 500-1,000 mA/g.

Referring to FIG. 14, the capacity of the lithium secondary battery of Comparative Example 5 that included commercially available silicon nanoparticles (mean particle size=50 nm) declined drastically during the first 6 cycles at a current density of 100 mA/g or less, then rapidly during about 20 cycles at a current density of 500 mA/g, gradually during 300 cycles, and finally to 182 mAh/g in the next 300 cycles.

In contrast, the porous silicon-carbon composite of Example 8 retained a capacity of 1,290 mAh/g at a current density of 100 mA/g or less. The capacity in the composite decreased to 985 mAh/g at a current density of 500 mA/g and then was maintained at 800 mAh/g or more until 100 cycles. Subsequently, the capacity decreased to 600 mAh/g at a current density of 1,000 mA/g and was then stably maintained until 300 cycles. The final capacity after 300 cycles was 300% higher than that of Comparative Example 5, with the charge/discharge efficiency recorded at 99.9% or higher. Therefore, the secondary battery of Example 8 according to the present disclosure exhibited remarkably high capacity and long lifespan characteristics, compared to the secondary battery containing the commercially available silicon nanoparticle-carbon composite of Comparative Example 5.

Figure 15:
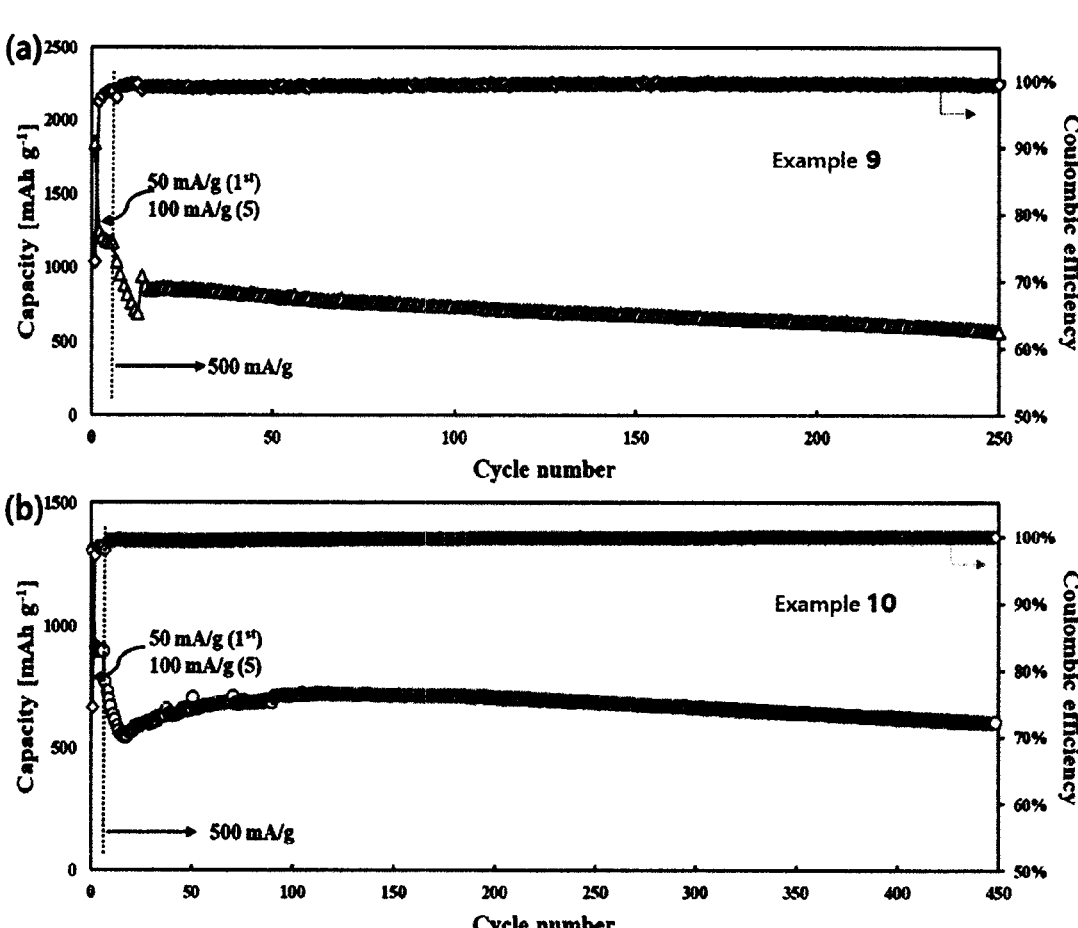
FIG. 15 is a graph showing charge/discharge cycle performance of the lithium secondary batteries of Examples 9 and 10.

FIG. 15 shows the charge/discharge cycle performance of the lithium secondary batteries (half-cell fabricated with lithium metal serving as a reference electrode) including electrodes made of the anode active materials containing the porous silicon-carbon composites prepared in Examples 9 and 10.

With reference to FIG. 15(a), the lithium secondary battery which employed the anode active material containing the porous silicon-carbon composite in Example 9 was measured to have a capacity of 1,170 to 1,240 mAh/g at a current density of 100 mA/g. The capacity drastically decreased to 690 mAh/g at a current density of 500 mA/g in the initial phase and then was stably maintained at a level of 570 mAh/g until 250 cycles, with the charge/discharge efficiency recorded at 99.5%. The secondary battery of Example 9 was superior to that of Comparative Example 5 in terms of capacity and cycle lifespan, but inferior to that of Example 8 where magnesiothermic reduction was conducted while the chamber was rotated at a speed of 17 rpm. This is construed to result from the fact that the porous silicon-carbon composite of Example 6 contained in the secondary battery of Example 9 had many pores distributed therein (see FIG. 13d), which is advantageous for absorbing volumetric expansion, but decreases conductivity and charge mobility within the inside of the electrode.

To solve the problem with the formation of pores inside the porous silicon-carbon composite, the secondary battery of Example 10 was fabricated with the porous silicon-carbon composite of Example 7 in which the porous silicon-carbon composite of Example 6 was mixed with graphite at a weight ratio of 50:50 and analyzed for electrochemical characteristics. The results are depicted in FIG. 15(b). The capacity of the secondary battery decreased to 900 to 910 mAh/g at a current density of 100 mA/g and drastically to 540 mAh/g at a current density of 500 mA/g until 11 cycles. Afterward, the secondary battery stably retained a capacity of about 607 mAh/g until 450 cycles, with an excellent charge/discharge efficiency recorded at 99.9% or higher.

In Table 5, below, capacity according to current density, and capacity retention are listed for the secondary batteries of Examples 8, 9, and 10 and Comparative Example 5, which were fabricated with the anode active materials respectively produced in Examples 4, 6, and 7 and Comparative Example 4.

TABLE 5

| Current Density (mA/g) | Comparison of Cycle Characteristic (unit) | Ex. 8 | Ex. 9 | Ex. 10 | C. Ex. 5 |
|---|---|---|---|---|---|
| 100 | Discharge capacity ($3^{rd}$ cycle) (mAh/g) | 1,273 | 1,206 | 898 | 1250 |
| 500 | Discharge capacity ($15^{th}$ cycle) (mAh/g) | 984 | 878 | 557 | 470 |
| 500/100 | Discharge capacity ratio (%) by current density ($15^{th}$ cycle/$3^{rd}$ cycle) | 77.3 | 72.8 | 62.0 | 37.6 |
| 500 | Discharge capacity ($100^{th}$ cycle) (mAh/g) | 869 | 738 | 719 | 343 |
| 500 | Capacity retention (%) at 15~100 cycles | 88.3 | 84.1 | 129.1 | 71.6 |
| 500 | Discharge capacity ($250^{th}$ cycle) (mAh/g) | — | 570 | 687 | 207 |
| 500 | Capacity retention (%) at 15~250 cycles | — | 64.9 | 123.3 | 43.2 |
| 1000 | Discharge capacity ($120^{th}$ cycle) (mAh/g) | 599 | — | — | — |
| 1000 | Discharge capacity ($300^{th}$ cycle) (mAh/g) | 562 | — | — | — |
| 1000 | Cycle retention (%) at 120~300 cycles | 93.8 | — | — | — |

Compared to the secondary battery of Comparative Example 5, which employed a commercially available silicon nanoparticle-carbon composite, the secondary batteries of Examples 8 to 10 were at least 10% higher in discharge capacity and capacity retention at the same density current, which are both indices for rate capability. Therefore, the application of an anode active material containing the porous silicon according to the Examples of the present disclosure to a secondary battery guarantees the secondary battery high-capacity and long lifespan characteristics.

<Experimental Example 10> SEM Analysis for Cross-Sectional Thickness Change in Electrode Included in Secondary Battery Before and After Cycles The secondary batteries of Examples 8 to 10 and Comparative Example 5 were measured for cross-sectional thickness changes in the electrodes used therein after the charge/discharge cycle tests of Experimental Example 9 by SEM analysis. The results are depicted in FIG. 16.

After 100 cycles, the secondary battery of Comparative Example 5 which employed a commercially silicon nanoparticle-carbon composite underwent volumetric expansion leading to cracking the cross section of the electrode. The electrode thickened to 161 μm which increased by 494% compared to 32.6 μm, which was the thickness before the cycle test (FIG. 16(*a*)). Like this, the accumulation of charge/discharge cycles caused electrode destruction and lost the conductive network. The capacity drastically decreased as the cycle proceeded, as shown in FIG. 14.

Figure 16:
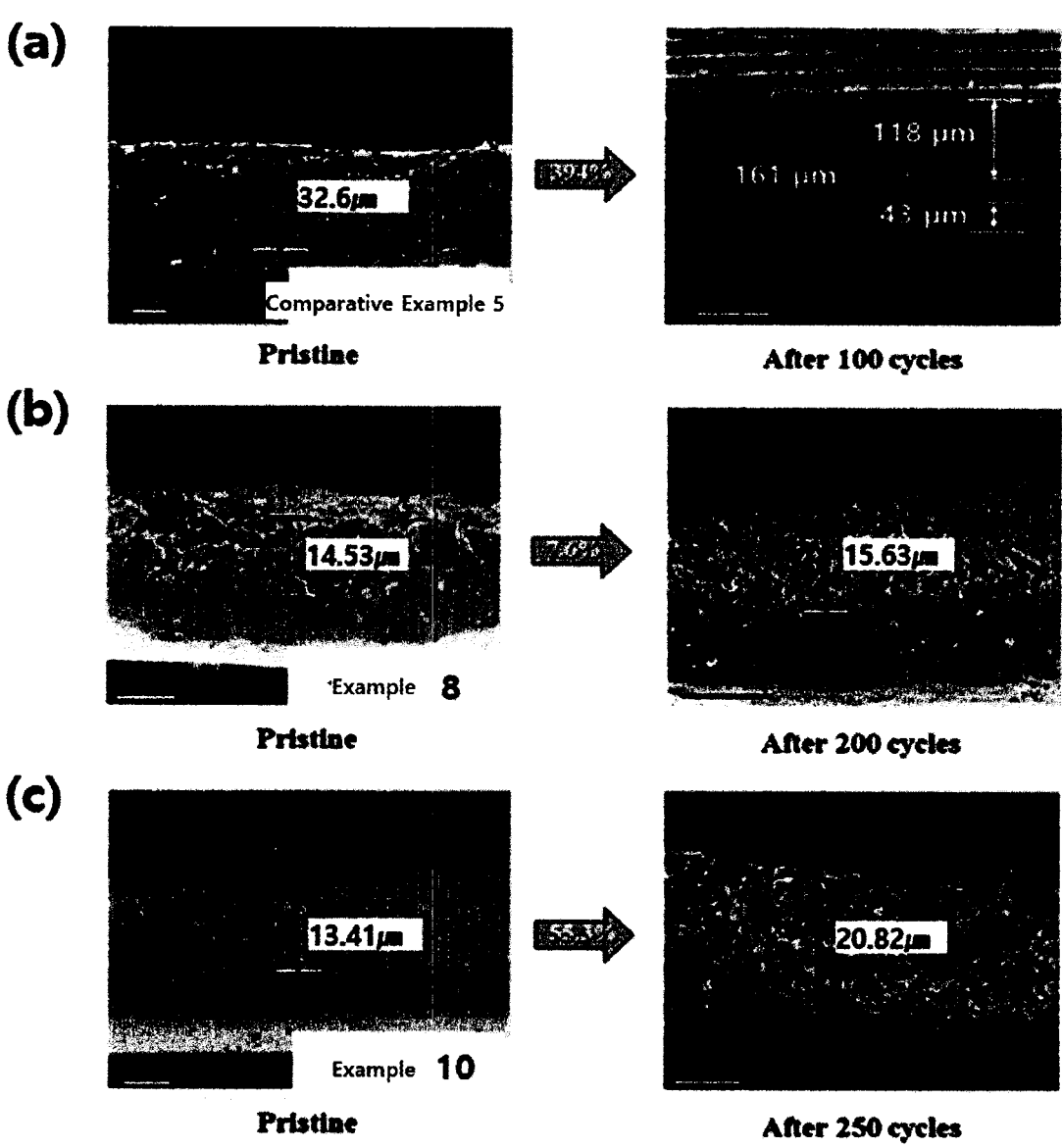
FIG. 16 shows SEM images of cross sections of the electrodes in the secondary batteries of Examples 8 and 10 and Comparative Example 5 before and after charge/discharge cycles.

In contrast, the secondary battery of Example 8, which employed the porous silicon nanoparticle-carbon composite of the present disclosure, was measured to have an electrode thickness of 15.63 μm after 200 cycles, which increased by only 7.6%, compared to 14.53 μm, the thickness before the cycle test (FIG. 16(*b*)). In addition, the secondary battery of Example 10, which employed the porous silicon nanoparticle-carbon composite of the present disclosure was measured to have an electrode thickness of 20.82 μm after 250 cycles, which increased by 55%, compared to 13.51 μm, the thickness before the cycle test (FIG. 16(*c*)). Therefore, the structure of the porous silicon effectively absorbs the volumetric expansion of silicon caused by charge/discharge. When an anode active material containing the porous silicon is applied thereto, the secondary battery can exhibit high capacity and long lifespan characteristics.

The invention claimed is:

1. A method for manufacturing porous silicon, the method comprising the steps of:
   (1) conducting a primary heat treatment on a first mixture containing a silicon precursor and a heat dispersant;
   (2) feeding a metal reducing agent to the first mixture and stirring to form a second mixture;
   (3) subjecting the second mixture to a secondary heat treatment in a sealed rotary reaction chamber that is rotated at a speed of 1 to 100 revolutions per minute under a non-oxidative atmosphere, the rotation being configured to maintain a substantially uniform $Mg:SiO_2$ molar ratio and to suppress formation of $Mg_2Si$ and $Mg_2SiO_4$ during reduction; and
   (4) washing the secondarily heat-treated second mixture with a solvent to recover porous silicon particles having a conversion rate to MgO of at least 70% and a porous-silicon yield of at least 60%.

2. The method of claim 1, wherein the silicon precursor is selected from silicon dioxide ($SiO_2$), silicon oxide (SiOx, $0<x<2$), silica gel, sand, glass, quartz, zeolite, and fumed silica, each having a particle size of 20 nm to 10 μm.

3. The method of claim 1, wherein the heat dispersant is at least one of sodium chloride (NaCl), potassium chloride (KCl), calcium chloride ($CaCl_2$)), and magnesium chloride ($MgCl_2$).

4. The method of claim 3, wherein the heat dispersant is contained at an amount of 100 to 1,200 parts by weight, based on 100 parts by weight of the silicon precursor.

5. The method of claim 1, wherein the primary heat treatment is conducted at a temperature of 550 to 800° C. for 1 to 5 hours.

6. The method of claim 1, wherein the metal reducing agent is selected from sodium (Na), magnesium (Mg), aluminum (Al), and a combination thereof.

7. The method of claim 6, wherein the metal reducing agent is mixed in an amount of 50 to 200 parts by weight per 100 parts by weight of the silicon precursor.

8. The method of claim 1, wherein the secondary heat treatment is carried out at a temperature of 300 to 1,000° C. for 1 to 24 hours under a pressure of $10^{-3}$ to 5 bar in a non-oxidative atmosphere.

9. The method of claim 1, wherein the step (4) is carried out by the sub-steps of:
   (4-1) washing the secondarily heat-treated reaction product with distilled water to remove the heat dispersant;
   (4-2) washing the heat dispersant-removed reaction product with a first acid solution to remove the oxidized metal reducing agent and recover the porous silicon; and
   (4-3) etching the recovered porous silicon with a second acid solution to remove impurities therefrom.

10. The method of claim 1, wherein the porous silicon particles recovered in step (4) have a specific surface area of 20 to 200 $m^2/g$ and a total pore volume of 0.1 $cm^3/g$ to 1.0 $cm^3/g$ as measured by a BET method; and individual primary silicon particles as constituents in the porous silicon particles have an average size of 10 to 50 nm.

\* \* \* \* \*